United States Patent
Miwa et al.

(10) Patent No.: US 10,770,930 B2
(45) Date of Patent: Sep. 8, 2020

(54) POWER RECEIVER AND ADAPTER

(71) Applicant: KYOCERA Corporation, Kyoto-shi, Kyoto (JP)

(72) Inventors: Tomoaki Miwa, Fujisawa (JP); Atsuhiko Kanda, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 8 days.

(21) Appl. No.: 16/337,913

(22) PCT Filed: Sep. 27, 2017

(86) PCT No.: PCT/JP2017/035009
§ 371 (c)(1),
(2) Date: Mar. 28, 2019

(87) PCT Pub. No.: WO2018/062297
PCT Pub. Date: Apr. 5, 2018

(65) Prior Publication Data
US 2019/0229562 A1 Jul. 25, 2019

(30) Foreign Application Priority Data

Sep. 28, 2016 (JP) ................................ 2016-190367
Sep. 28, 2016 (JP) ................................ 2016-190370

(51) Int. Cl.
*H02J 50/20* (2016.01)
*H02J 50/80* (2016.01)
(Continued)

(52) U.S. Cl.
CPC .............. *H02J 50/80* (2016.02); *H02J 50/20* (2016.02); *H02J 50/40* (2016.02); *H02J 50/90* (2016.02)

(58) Field of Classification Search
CPC .... H02J 5/00; H02J 7/025; H02J 17/00; H02J 50/20; H02J 50/80; H02J 50/90
See application file for complete search history.

(56) References Cited

U.S. PATENT DOCUMENTS 7,450,910 B2 11/2008 Aoki
8,159,364 B2 4/2012 Zeine
(Continued)

FOREIGN PATENT DOCUMENTS

JP H5-56433 A 3/1993
JP H6-58550 U 8/1994
(Continued)

*Primary Examiner* — Levi Gannon
(74) *Attorney, Agent, or Firm* — Hauptman Ham, LLP

(57) ABSTRACT

A power receiver includes: a power generator configured to generate power by external electromagnetic waves; a positive electrode terminal; and a negative electrode terminal. The positive electrode terminal is configured to function as a positive electrode when the power generated by the power generator is output to an external electronic device. The negative electrode terminal is configured to function as a negative electrode when the power generated by the power generator is output to the external electronic device. The positive electrode terminal includes a first contact portion configured to be electrically connected to the external electronic device. The negative electrode terminal includes a second contact portion configured to be electrically connected to the external electronic device. A distance between the first contact portion and the second contact portion corresponds to a height defined in IEC 60086 or JIS C 8500.

18 Claims, 22 Drawing Sheets

(51) Int. Cl.
*H02J 50/90* (2016.01)
*H02J 50/40* (2016.01)

(56) References Cited

U.S. PATENT DOCUMENTS

| | | | |
|---|---|---|---|
| 8,410,953 B2 | 4/2013 | Zeine | |
| 8,558,661 B2 | 10/2013 | Zeine | |
| 8,854,176 B2 | 10/2014 | Zeine | |
| 8,892,033 B2 | 11/2014 | Terada et al. | |
| 9,142,973 B2 | 9/2015 | Zeine | |
| 9,343,922 B2 * | 5/2016 | McCauley | H02J 50/12 |
| 9,780,573 B2 * | 10/2017 | McCauley | H02J 50/70 |
| 9,948,143 B2 | 4/2018 | Abe | |
| 10,008,887 B2 | 6/2018 | Zeine | |
| 2005/0068009 A1 | 3/2005 | Aoki | |
| 2007/0222681 A1 * | 9/2007 | Greene | H01M 2/1022 343/700 MS |
| 2010/0181841 A1 * | 7/2010 | Azancot | H01F 27/2885 307/104 |
| 2010/0181964 A1 * | 7/2010 | Huggins | H02J 50/20 320/108 |
| 2010/0315045 A1 | 12/2010 | Zeine | |
| 2011/0050164 A1 * | 3/2011 | Partovi | H01F 38/14 320/108 |
| 2012/0149307 A1 | 6/2012 | Terada et al. | |
| 2012/0193999 A1 | 8/2012 | Zeine | |
| 2013/0207604 A1 | 8/2013 | Zeine | |
| 2014/0035524 A1 | 2/2014 | Zeine | |
| 2015/0022022 A1 | 1/2015 | Zeine | |
| 2015/0244175 A1 | 8/2015 | Abe | |
| 2016/0013685 A1 | 1/2016 | Zeine | |
| 2016/0301240 A1 * | 10/2016 | Zeine | H02J 7/025 |
| 2016/0344226 A1 * | 11/2016 | Wu | H02J 3/381 |
| 2016/0372952 A1 * | 12/2016 | Chen | H02J 1/10 |
| 2017/0358959 A1 | 12/2017 | Zeine | |
| 2018/0287417 A1 * | 10/2018 | Zeine | H02J 50/80 |

FOREIGN PATENT DOCUMENTS

| | | |
|---|---|---|
| JP | H7-245888 A | 9/1995 |
| JP | H8-182320 A | 7/1996 |
| JP | H9-200951 A | 7/1997 |
| JP | 2005-110399 A | 4/2005 |
| JP | 2007-22382 A | 2/2007 |
| JP | 2008-271647 A | 11/2008 |
| JP | 2012-50242 A | 3/2012 |
| JP | 2012-125112 A | 6/2012 |
| JP | 2013-89414 A | 5/2013 |
| JP | 2014-223018 A | 11/2014 |
| WO | 2014/038107 A1 | 3/2014 |

* cited by examiner

POWER RECEIVER AND ADAPTER

CROSS REFERENCE TO RELATED APPLICATION

This application is a national phase of International Application Number PCT/JP2017/035009, filed Sep. 27, 2017, which claims priority to and the benefit of Japanese Patent Application No. 2016-190367 filed on Sep. 28, 2016 and Japanese Patent Application No. 2016-190370 filed on Sep. 28, 2016, the entire disclosures of which are incorporated herein by reference.

TECHNICAL FIELD

The present disclosure relates to a power receiver and an adapter.

BACKGROUND

Power supply methods of supplying power to electronic devices by electromagnetic waves are conventionally known. For example, a conventional power transmitter supplies power by microwaves to a device requiring power.

SUMMARY

A power receiver according to an embodiment of the present disclosure comprises: a power generator configured to generate power by external electromagnetic waves; a positive electrode terminal; and a negative electrode terminal. The positive electrode terminal is configured to function as a positive electrode when the power generated by the power generator is output to an external electronic device. The negative electrode terminal is configured to function as a negative electrode when the power generated by the power generator is output to the external electronic device. The positive electrode terminal includes a first contact portion configured to be electrically connected to the external electronic device. The negative electrode terminal includes a second contact portion configured to be electrically connected to the external electronic device. A distance between the first contact portion and the second contact portion corresponds to a height defined in IEC 60086 or JIS C 8500.

An adapter according to an embodiment of the present disclosure comprises: a container; and an output interface. The container is configured to contain a power receiver including a power generator that generates power by external electromagnetic waves. The output interface is configured to output the power generated by the power receiver to an external electronic device. The output interface includes a first output interface configured to be connected to a positive electrode terminal of the power receiver and a second output interface configured to be connected to a negative electrode terminal of the power receiver. A distance between a first contact portion of the first output interface to be connected to the external electronic device and a second contact portion of the second output interface to be connected to the external electronic device corresponds to a height defined in IEC 60086 or JIS C 8500.

An adapter according to an embodiment of the present disclosure comprises: a mount; and an output interface. The mount is configured to have removably mounted thereon a power receiver including a power generator that generates power by external electromagnetic waves. The output interface is configured to output the power generated by the power receiver to an external electronic device. The output interface is configured to be electrically connected to any one of a positive electrode terminal and a negative electrode terminal included in the power receiver. The output interface includes a contact portion configured to be electrically connected to the external electronic device, and the any one of the positive electrode terminal and the negative electrode terminal includes a contact portion configured to be electrically connected to the electronic device. A distance between the contact portion of the output interface and the contact portion of the any one of the positive electrode terminal and the negative electrode terminal corresponds to a height defined in IEC 60086 or JIS C 8500.

An adapter according to an embodiment of the present disclosure comprises: a container configured to contain a power receiver including a power generator that generates power by external electromagnetic waves, or a mount configured to have removably mounted thereon the power receiver; and a connector. The connector is an output interface configured to output the power generated by the power receiver to an external electronic device. The connector complies with a USB standard.

An adapter according to an embodiment of the present disclosure comprises: a container configured to contain a power receiver including a power generator that generates power by external electromagnetic waves, or a mount configured to have removably mounted thereon the power receiver; and an electrical outlet. The electrical outlet is an output interface configured to output the power generated by the power receiver to an external electronic device. The electrical outlet complies with JIS C 8303.

DETAILED DESCRIPTION

With conventional power supply methods, electronic devices need to be designed specifically to be able to receive power supply by electromagnetic waves. For this reason, electronic devices that are usable in conventional power supply methods are limited. Conventional power supply methods thus have room for improvement.

In view of the above points, it is desired to provide a power receiver that achieves an improved power supply method.

Embodiments of the present disclosure will be described below with reference to drawings.

Embodiment 1

Figure 1:
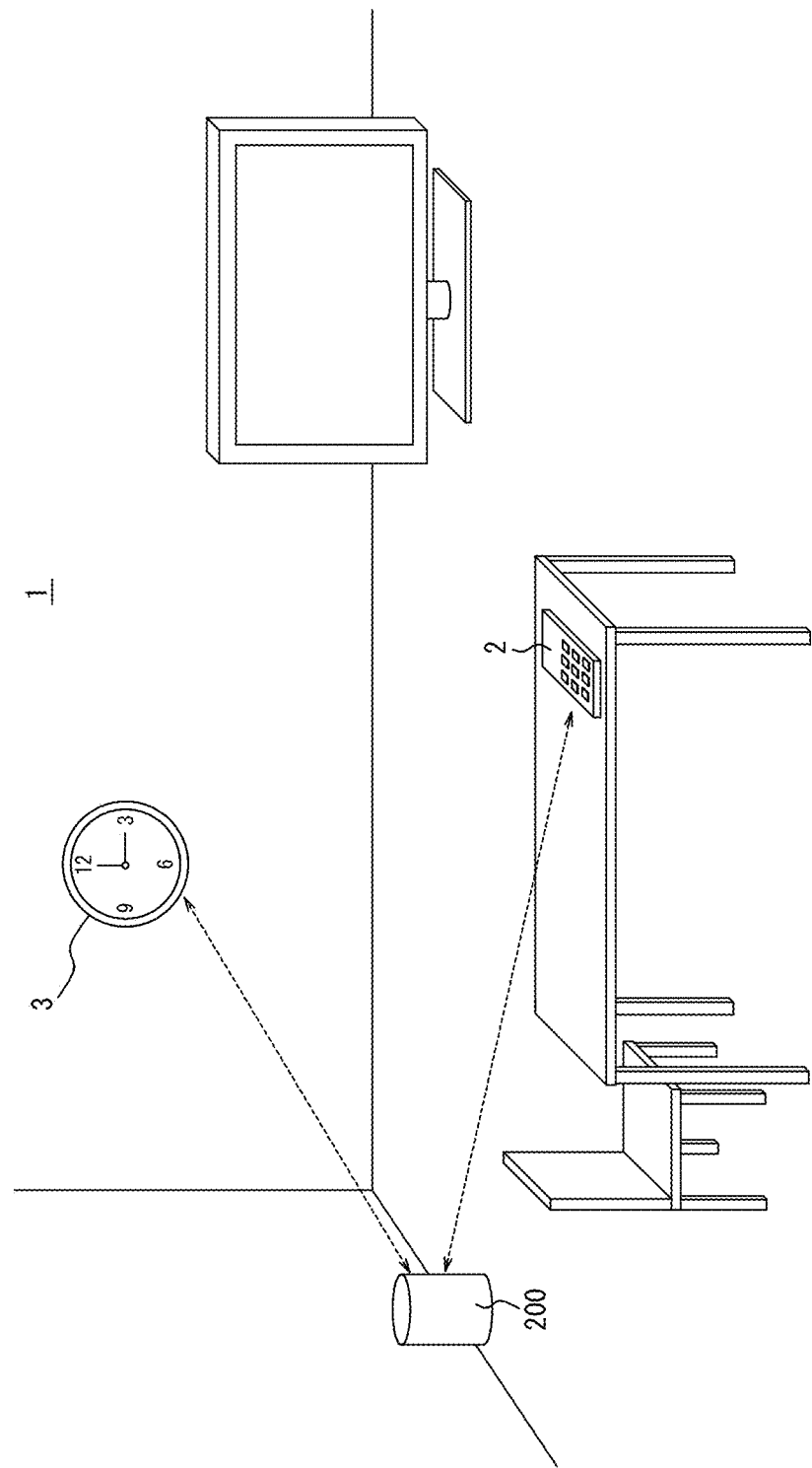
FIG. 1 is a diagram illustrating the schematic structure of a power supply system according to Embodiment 1 of the present disclosure.

FIG. 1 illustrates the schematic structure of a power supply system 1 according to Embodiment 1 of the present disclosure. The power supply system 1 includes a remote control 2, a clock 3, and a power transmitter 200. The remote control 2 and the clock 3 each contain a dry battery-type power receiver 100 as illustrated in FIG. 2.

For example, the remote control 2 and the clock 3 each contain the power receiver 100 in its battery holder. A part for containing a dry battery in an electronic device has various names, such as battery holder, battery box, and battery case. Herein, these parts are collectively referred to as "battery holder".

Figure 2:
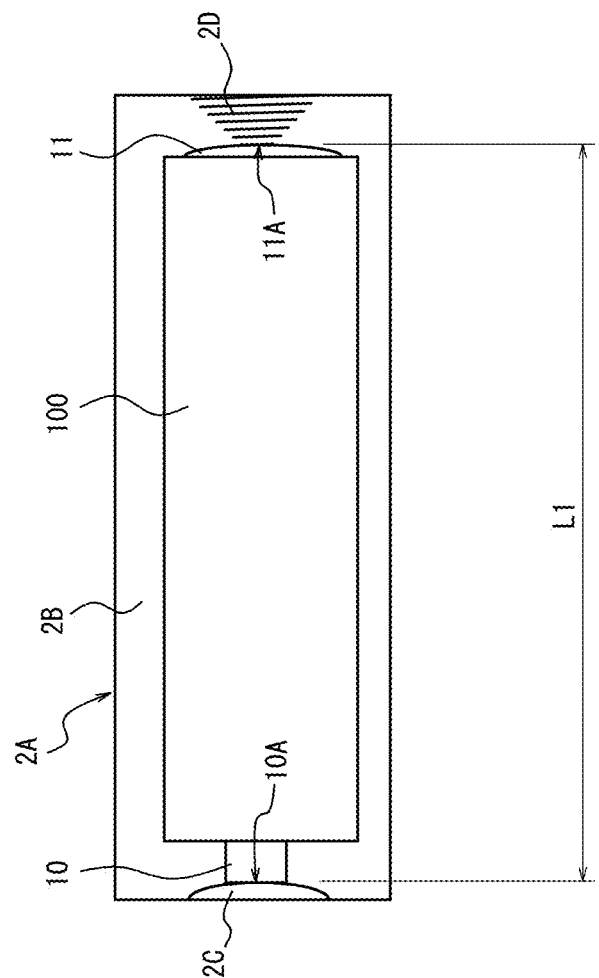
FIG. 2 is a diagram illustrating a state in which a power receiver according to Embodiment 1 of the present disclosure is contained in a battery holder of a remote control.

FIG. 2 illustrates a state in which the power receiver 100 is contained in a battery holder 2A of the remote control 2. The battery holder 2A is provided on the back of the remote control 2. The battery holder 2A includes a container 2B, a terminal 2C that is a fixed terminal on the positive electrode side, and a terminal 2D that is a movable terminal on the negative electrode side. When the power receiver 100 is fitted into the container 2B, a positive electrode terminal 10 of the power receiver 100 is electrically connected to the terminal 2C on the positive electrode side, and a negative electrode terminal 11 of the power receiver 100 is electrically connected to the terminal 2D on the negative electrode side.

The state in which the power receiver 100 is contained in a battery holder of an electronic device as illustrated in FIG. 2 is hereafter referred to as a "contained state".

The remote control 2 and the clock 3 are driven by power supplied from the power receiver 100. Although FIG. 1 illustrates the remote control 2 and the clock 3 as examples of electronic devices that can be driven by power supplied from the power receiver 100, electronic devices that can be driven by power supplied from the power receiver 100 are not limited to such. Electronic devices that can be driven by power supplied from the power receiver 100 may be any electronic devices that can be driven by power supplied from a dry battery, a button battery, or the like. Examples include a mouse and an electronic dictionary.

The power receiver 100 receives electromagnetic waves for power supply from the power transmitter 200. The power receiver 100 converts the received electromagnetic waves into direct-current (DC) power. The power receiver 100 supplies the DC power resulting from the conversion to the electronic device containing the power receiver 100. The power receiver 100 supplies the DC power to the electronic device via the positive electrode terminal 10 connected to the terminal 2C on the positive electrode side of the electronic device and the negative electrode terminal 11 connected to the terminal 2D on the negative electrode side of the electronic device, as illustrated in FIG. 2.

The power transmitter 200 is, for example, a home gateway, a wireless power transmission system, or the like. For example, the power transmitter 200 is installed in a home. The power transmitter 200 generates electromagnetic waves for power supply. The power transmitter 200 transmits the generated electromagnetic waves to, for example, a power receiver in an electronic device installed in the same home. In the example in FIG. 1, the power transmitter 200 transmits the electromagnetic waves to the power receiver 100 in the remote control 2 and the power receiver 100 in the clock 3.

The power transmitter 200 may perform authentication with the power receiver 100, and transmit electromagnetic waves for power supply to the power receiver 100 only in the case where the authentication is successful. Thus, the power transmitter 200 can be prevented from transmitting power to a power receiver in any unintended electronic device (e.g. an electronic device in a neighboring house). This authentication process will be described briefly below. First, the power transmitter 200 receives a pilot signal requesting authentication, from the power receiver 100. The power transmitter 200 then transmits a signal requesting identification information, to the power receiver 100. Subsequently, upon receiving the signal requesting identification information from the power transmitter 200, the power receiver 100 transmits a signal including identification information for the power receiver 100 to the power transmitter 200. Upon acquiring the signal including the identification information for the power receiver 100 from the power receiver 100, the power transmitter 200 determines whether the identification information for the power receiver 100 is authenticated. In the case where the power transmitter 200 determines that the identification information for the power receiver 100 is authenticated, the power transmitter 200 transmits a signal notifying authentication success to the power receiver 100. The power transmitter 200 further transmits electromagnetic waves for power supply to the power receiver 100.

The power transmitter 200 may transmit electromagnetic waves for power supply to the power receiver 100, without performing authentication with the power receiver 100. Thus, the power transmitter 200 can be installed in a public place and supply power to any electronic device.

The external structure of the power receiver 100 will be described below, with reference to FIG. 3. The power receiver 100 includes the positive electrode terminal 10, the negative electrode terminal 11, a top surface 12, a bottom surface 13, and a body 14.

The positive electrode terminal 10 has, for example, a convex shape. The positive electrode terminal 10 is located at the center of the top surface 12. The positive electrode terminal 10 functions as a positive electrode when outputting power generated by a power generator 20 (see FIG. 4) in the power receiver 100 to the external electronic device. The positive electrode terminal 10 includes a first contact portion 10A. The first contact portion 10A is electrically connected to the terminal on the positive electrode side (the terminal 2C in FIG. 2) of the electronic device, in the contained state.

The negative electrode terminal 11 has, for example, an approximately planar shape. The negative electrode terminal 11 is located at the center of the bottom surface 13. The negative electrode terminal 11 functions as a negative electrode when outputting power generated by the power generator 20 (see FIG. 4) in the power receiver 100 to the external electronic device. The negative electrode terminal 11 includes a second contact portion 11A. The second contact portion 11A is electrically connected to the terminal on the negative electrode side (the terminal 2D in FIG. 2) of the electronic device, in the contained state.

The distance L1 between the first contact portion 10A and the second contact portion 11A corresponds to a height defined in a predetermined standard relating to primary batteries. Examples of the predetermined standard include IEC 60086 which is a standard relating to primary batteries defined by the International Electrotechnical Commission (IEC), and JIS C 8500 which is a standard in Japan corresponding to IEC 60086. This enables the first contact portion 10A to be electrically connected to the terminal on the positive electrode side (the terminal 2C in FIG. 2) of the electronic device in the contained state. This also enables the second contact portion 11A to be electrically connected to the terminal on the negative electrode side (the terminal 2D in FIG. 2) of the electronic device in the contained state.

For example, in the case where the distance L1 is fixed to 59.5 mm to 61.5 mm which are the heights of D size dry batteries, the power receiver 100 can be contained in a battery holder for D size dry batteries in an electronic device and used to drive the electronic device. For example, in the case where the distance L1 is fixed to 48.6 mm to 50.0 mm which are the heights of C size dry batteries, the power receiver 100 can be contained in a battery holder for C size dry batteries in an electronic device and used to drive the electronic device. For example, in the case where the distance L1 is fixed to 49.2 mm to 50.5 mm which are the heights of AA size dry batteries, the power receiver 100 can be contained in a battery holder for AA size dry batteries in an electronic device and used to drive the electronic device. For example, in the case where the distance L1 is fixed to 43.3 mm to 44.5 mm which are the heights of AAA size dry batteries, the power receiver 100 can be contained in a battery holder for AAA size dry batteries in an electronic device and used to drive the electronic device. For example, in the case where the distance L1 is fixed to 29.1 mm to 30.2 mm which are the heights of N size dry batteries, the power receiver 100 can be contained in a battery holder for N size dry batteries in an electronic device and used to drive the electronic device. For example, in the case where the distance L1 is fixed to about 3.2 mm which is the height of button batteries, the power receiver 100 can be contained in a battery holder for button batteries in an electronic device and used to drive the electronic device.

Figure 7:
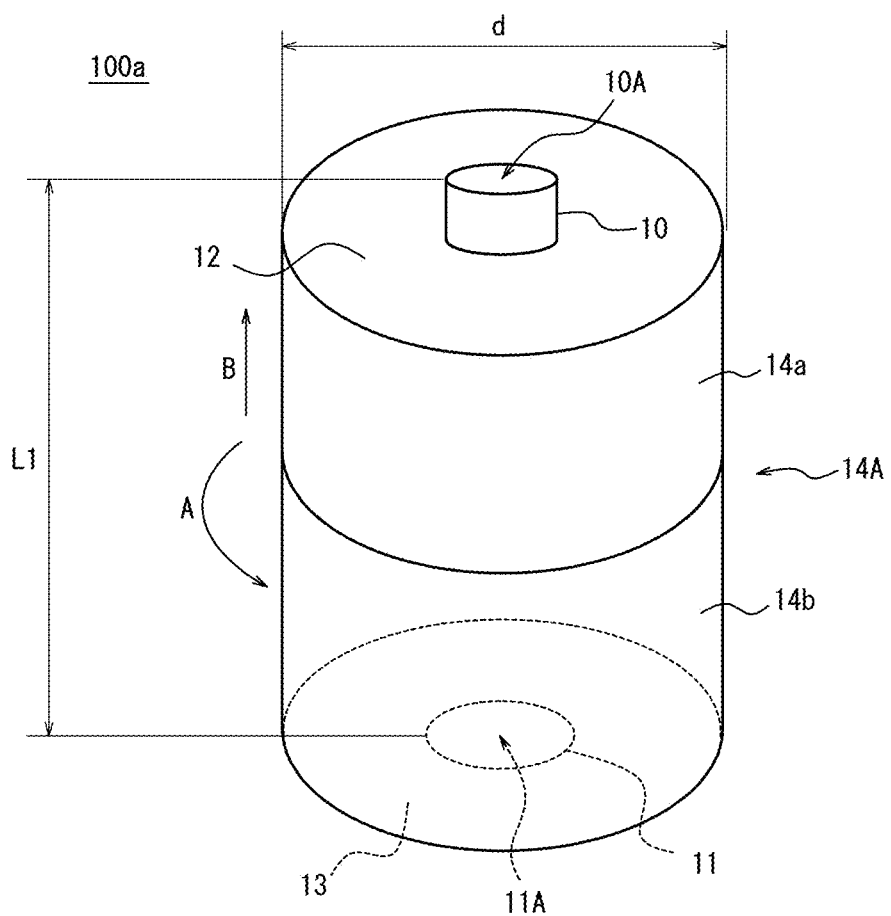
FIG. 7 is an external perspective diagram illustrating an alternative structure of the power receiver according to Embodiment 1 of the present disclosure.

The exterior of the power receiver 100 may be configured so that the distance L1 is adjustable for various battery holders. With such a structure, the power receiver 100 can be contained in various battery holders and used to drive various electronic devices. For example, the exterior of the power receiver 100 may be configured so that the power receiver 100 can be contained in a battery holder for D size dry batteries to a battery holder for N size dry batteries. An example of this structure will be given later in the description of an alternative structure (FIG. 7).

The top surface 12 is located to cover the top of the body 14. The positive electrode terminal 10 is located in the center part of the top surface 12. The shape of the top surface 12 may be any shape depending on the shape of the body 14. For example, the shape of the top surface 12 may be circular, triangular, or hexagonal depending on the shape of the body 14.

The bottom surface 13 is located to cover the bottom of the body 14. The negative electrode terminal 11 is located in the center part of the bottom surface 13. The shape of the bottom surface 13 may be any shape depending on the shape of the body 14. For example, the shape of the bottom surface 13 may be circular, triangular, or hexagonal depending on the shape of the body 14.

The body 14 is, for example, columnar. The top surface 12 is located on the top side of the body 14. The bottom surface 13 is located on the bottom side of the body 14. The shape of the body 14 may be any shape. For example, the shape of the body 14 may be a cylinder, a triangular prism, or a hexagonal prism.

The body 14 contains at least part of the power generator 20 (see FIG. 4) in the power receiver 100. As an example, the body 14 may contain a rectifier circuit 20B (see FIG. 4), as part of the power generator 20. In this case, an antenna 20A (see FIG. 4) may be located on the body 14. As another example, the body 14 may contain the whole power generator 20 in the power receiver 100.

An optical emitter 22 (see FIG. 4) in the power receiver 100 is located on the body 14. The optical emitter 22 emits light when the power receiver 100 is generating power.

The diameter d of the body 14 may correspond to a diameter defined in a predetermined standard relating to primary batteries, based on the electronic device in which the power receiver 100 is contained. Examples of the predetermined standard include IEC 60086 and JIS C 8500. Thus, the power receiver 100 can be fitted without gaps into the battery holder.

For example, in the case where the diameter d is fixed to 32.2 mm to 34.2 mm which are the diameters of D size dry batteries, the power receiver 100 can be fitted without gaps into a battery holder for D size dry batteries. For example, in the case where the diameter d is fixed to 24.7 mm to 26.2 mm which are the diameters of C size dry batteries, the power receiver 100 can be fitted without gaps into a battery holder for C size dry batteries. For example, in the case where the diameter d is fixed to 13.5 mm to 14.5 mm which are the diameters of AA size dry batteries, the power receiver 100 can be fitted without gaps into a battery holder for AA size dry batteries. For example, in the case where the diameter d is fixed to 9.5 mm to 10.5 mm which are the diameters of AAA size dry batteries, the power receiver 100 can be fitted without gaps into a battery holder for AAA size dry batteries. For example, in the case where the diameter d is fixed to 7.7 mm to 8.3 mm which are the diameters of N size dry batteries, the power receiver 100 can be fitted without gaps into a battery holder for N size dry batteries. For example, in the case where the diameter d is fixed to about 20 mm which is the diameter of button batteries, the power receiver 100 can be fitted without gaps into a battery holder for button batteries.

With such a structure, the power receiver 100 can be contained in a battery holder of an electronic device designed to be driven by a dry battery or the like. By containing, instead of a dry battery, the power receiver 100 in the battery holder of the electronic device, the electronic device can be supplied with power from the power transmitter 200 illustrated in FIG. 1. Hence, according to this embodiment, an electronic device designed to be driven by a dry battery or the like can be supplied with power by electromagnetic waves. The power supply method can thus be improved according to this embodiment.

Figure 4:
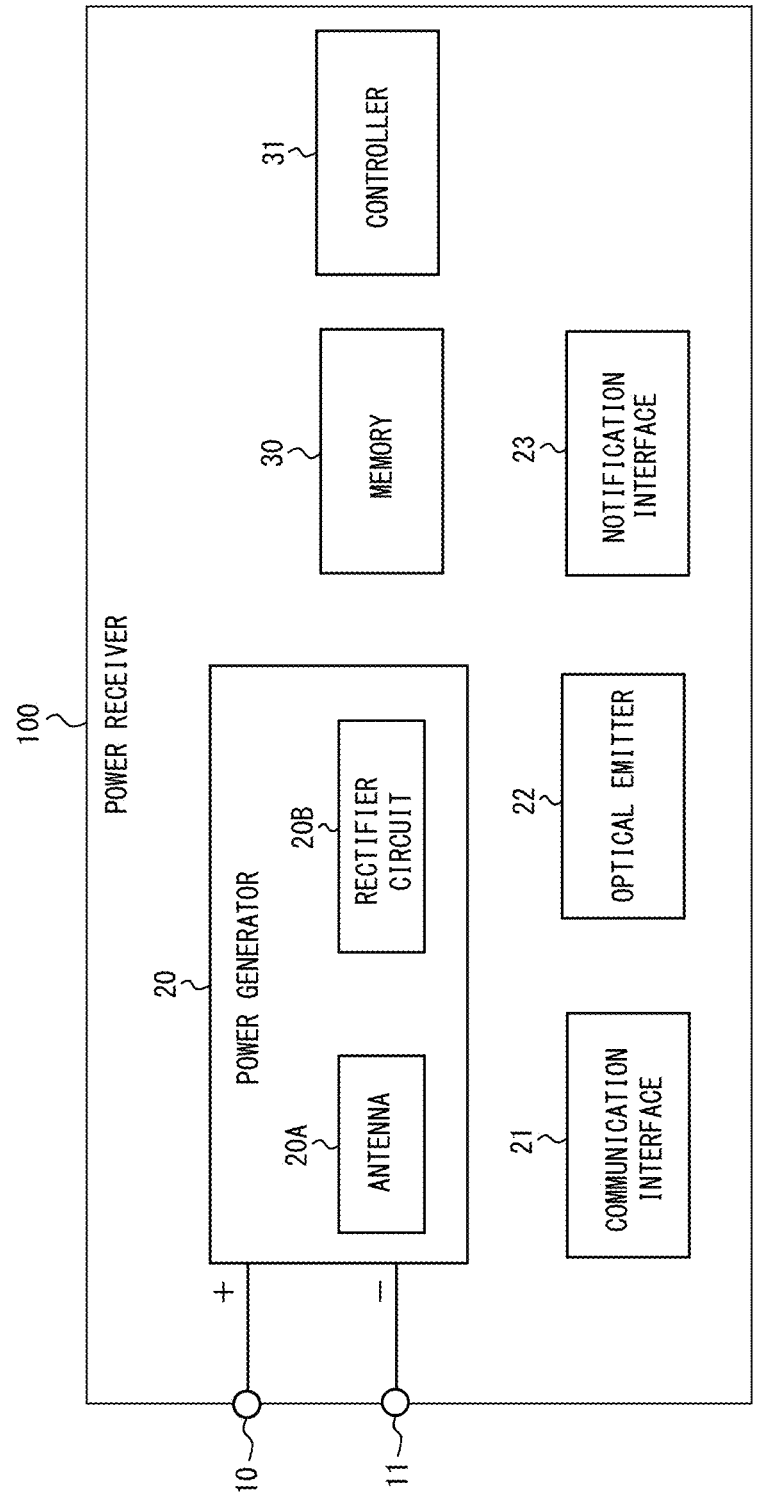
FIG. 4 is a functional block diagram of the power receiver according to Embodiment 1 of the present disclosure.

The functions of the power receiver 100 will be described below, with reference to FIG. 4. The power receiver 100 includes the power generator 20, a communication interface 21, the optical emitter 22, a notification interface 23, a memory 30, and a controller 31.

The power generator 20 generates power by external electromagnetic waves, based on control by the controller 31. In this embodiment, the power generator 20 generates power by electromagnetic waves from the power transmitter 200 illustrated in FIG. 1. The power generator 20 supplies the generated power to the external electronic device via the positive electrode terminal 10 and the negative electrode terminal 11. In the case where the power receiver 100 is contained in a battery holder of an electronic device designed to be driven by a dry battery, the power generator 20 sets the potential difference between the positive electrode terminal 10 and the negative electrode terminal 11 to 0.8 V to 1.7 V. This is based on the fact that the nominal voltage of dry batteries is 1.5 V and the discharge termination voltage of dry batteries is about 0.8 V to 1.0 V. In the case where the power receiver 100 is contained in a battery holder of an electronic device designed to be driven by a button battery, the power generator 20 sets the potential difference between the positive electrode terminal 10 and the negative electrode terminal 11 to 2.0 V to 3.0 V. This is based on the fact that the nominal voltage of button batteries is 3.0 V and the discharge termination voltage of button batteries is about 2.0 V.

The power generator 20 includes the antenna 20A and the rectifier circuit 20B. The antenna 20A receives electromagnetic waves from the power transmitter 200 illustrated in FIG. 1. The rectifier circuit 20B converts the electromagnetic waves received by the antenna 20A into DC power. The rectifier circuit 20B supplies the DC power resulting from the conversion to the external electronic device via the positive electrode terminal 10 and the negative electrode terminal 11.

The communication interface 21 communicates with an external device. In this embodiment, the communication interface 21 communicates with the power transmitter 200 illustrated in FIG. 1. Instead of the communication interface 21, the antenna 20A may communicate with the power transmitter 200.

The optical emitter 22 emits light when the power generator 20 is generating power, based on control by the controller 31. The optical emitter 22 may change any one of emission intensity, emission mode, and emission color depending on the generated power of the power generator 20, based on control by the controller 31. For example, in the case where the generated power of the power generator 20 is greater than or equal to a first predetermined value, the optical emitter 22 may emit light with an emission intensity of greater than or equal to a first value. For example, in the case where the generated power of the power generator 20 is less than a second predetermined value, the optical emitter 22 may flash. For example, the optical emitter 22 may use green as the emission color in the case where the generated power of the power generator 20 is greater than or equal to the first predetermined value, and use red as the emission color in the case where the generated power of the power generator 20 is less than the second predetermined value.

The notification interface 23 is, for example, a speaker or a vibrator. The notification interface 23 notifies of a decrease of the generated power of the power generator 20, based on control by the controller 31. For example, in the case where the notification interface 23 is a speaker, the speaker outputs speech stating that the "generated power is decreasing", to notify of a decrease of the generated power of the power generator 20. For example, in the case where the notification interface 23 is a vibrator, the vibrator vibrates to notify of a decrease of the generated power of the power generator 20.

The memory 30 stores information necessary for the processes of the power receiver 100 and a program in which the processes for achieving the functions of the power receiver 100 are written. The memory 30 stores, for example, the below-described first threshold and the identification information for the power receiver 100.

The controller 31 controls and manages the entire power receiver 100. The controller 31 is composed of, for example, any suitable processor such as a general-purpose central processing unit (CPU) that reads software for executing the processes of each of the functions, or a dedicated processor specialized for the processes of each of the functions.

In this embodiment, the controller 31 causes the power generator 20 to generate power when the power receiver 100 is in the contained state. The process of the controller 31 relating to this will be described in the following power generation process.

<Power Generation Process>

The controller 31 causes the power generator 20 to generate power, when the power receiver 100 is in the contained state. For example, the controller 31 determines whether the power receiver 100 is in the contained state. In the case where the controller 31 determines that the power receiver 100 is in the contained state, the controller 31 causes the power generator 20 to start power generation. An example of the process of determining whether the power receiver 100 is in the contained state will be described below.

For example, when the power receiver 100 is in the contained state illustrated in FIG. 2, the positive electrode terminal 10 is connected to the terminal 2C on the positive electrode side of the electronic device, and the negative electrode terminal 11 is connected to the terminal 2D on the negative electrode side of the electronic device. Accordingly, when the power receiver 100 is in the contained state, power corresponding to the standby power of the electronic device is output from the power receiver 100 to the electronic device via the positive electrode terminal 10 and the negative electrode terminal 11, even though the electronic device is not driven. Hence, in the case where the controller 31 determines that the power corresponding to the standby power of the electronic device is output from the positive electrode terminal 10 and the negative electrode terminal 11, the controller 31 determines that the power receiver 100 is in the contained state.

The controller 31 causes the optical emitter 22 to emit light, when the power generator 20 is generating power. In this case, the controller 31 may change any one of the emission intensity, emission mode, and emission color of the optical emitter 22, depending on the generated power of the power generator 20. For example, in the case where the generated power of the power generator 20 is greater than or equal to the first predetermined value, the controller 31 may set the emission intensity of the optical emitter 22 to greater than or equal to the first value. For example, in the case where the generated power of the power generator 20 is less than the second predetermined value, the controller 31 may cause the optical emitter 22 to flash. For example, the controller 31 may set the emission color of the optical emitter 22 to green in the case where the generated power of the power generator 20 is greater than or equal to the first predetermined value, and set the emission color of the optical emitter 22 to red in the case where the generated power of the power generator 20 is less than the second predetermined value.

In the case where the controller 31 determines that the generated power of the power generator 20 is less than or equal to a first threshold, the controller 31 causes the notification interface 23 to notify of a decrease of the generated power. For example, in the case where the notification interface 23 is a speaker, the controller 31 causes the speaker to output speech stating that the "generated power is decreasing", to notify of a decrease of the generated power. For example, in the case where the notification interface 23 is a vibrator, the controller 31 causes the vibrator to vibrate to notify of a decrease of the generated power.

As mentioned above, the power transmitter 200 may perform authentication with the power receiver 100, and transmit electromagnetic waves for power supply to the power receiver 100 only in the case where the authentication is successful. In the case where the power transmitter 200 has such specifications, the controller 31 performs a communication process for authentication with respect to the power transmitter 200. The processing of the controller 31 relating to this will be described in the following authentication process.

<Authentication Process>

The controller 31 transmits a pilot signal requesting authentication, to the power transmitter 200 via the communication interface 21. For example, the controller 31 transmits the pilot signal requesting authentication, triggered by the power receiver 100 entering the contained state. When the power transmitter 200 acquires the pilot signal from the power receiver 100, the power transmitter 200 transmits a signal requesting the identification information for the power receiver 100, to the power receiver 100.

The controller 31 determines whether the signal requesting the identification information for the power receiver 100 has been acquired from the power transmitter 200 via the communication interface 21. In the case where the controller 31 determines that the signal requesting the identification information for the power receiver 100 has been acquired, the controller 31 transmits a signal including the identification information for the power receiver 100 to the power transmitter 200 via the communication interface 21. When the power transmitter 200 acquires the signal including the identification information for the power receiver 100 from the power receiver 100, the power transmitter 200 determines whether the identification information for the power receiver 100 is authenticated. In the case where the power transmitter 200 determines that the identification information for the power receiver 100 is authenticated, the power transmitter 200 transmits a signal notifying authentication success to the power receiver 100. The power transmitter 200 further transmits electromagnetic waves for power supply to the power receiver 100.

The controller 31 determines whether the signal notifying authentication success has been acquired from the power transmitter 200 via the communication interface 21. In the case where the controller 31 determines that the signal notifying authentication success has been acquired from the power transmitter 200 via the communication interface 21, the controller 31 causes the power generator 20 to start power generation.

[System Operation]

<Power Generation Operation>

Operation of the power receiver 100 according to this embodiment will be described below. Operation of the power receiver 100 when generating power will be described first, with reference to FIG. 5.

First, the controller 31 determines whether the power receiver 100 is in the contained state (step S101). In the case where the controller 31 determines that the power receiver 100 is in the contained state (step S101: Yes), the controller 31 advances to the process of step S102. In the case where the controller 31 determines that the power receiver 100 is not in the contained state (step S101: No), the controller 31 ends the process.

In the process of step S102, the controller 31 causes the power generator 20 to start power generation. The power generator 20 accordingly starts generating power by electromagnetic waves from the power transmitter 200 illustrated in FIG. 1. In the process of step S103, the controller 31 causes the optical emitter 22 to emit light.

With such processes of steps S102 and S103, the optical emitter 22 emits light when the power generator 20 is generating power. This enables the user to recognize whether the power receiver 100 is generating power by viewing the optical emitter 22.

In the process of step S104, the controller 31 determines whether the generated power of the power generator 20 is less than or equal to the first threshold. In the case where the controller 31 determines that the generated power of the power generator 20 is less than or equal to the first threshold (step S104: Yes), the controller 31 advances to the process of step S105. In the case where the controller 31 determines that the generated power of the power generator 20 is more than the first threshold (step S104: No), the controller 31 ends the process.

In the process of step S105, the controller 31 causes the notification interface 23 to notify of a decrease of the generated power. For example, in the case where the notification interface 23 is a speaker, the controller 31 causes the speaker to output speech stating that the "generated power is decreasing", to notify of a decrease of the generated power. For example, in the case where the notification interface 23 is a vibrator, the controller 31 causes the vibrator to vibrate to notify of a decrease of the generated power.

With such processes of steps S104 and S105, when the generated power of the power receiver 100 is less than or equal to the first threshold, the user is notified of a decrease of the generated power. The user can accordingly recognize that the power receiver 100 cannot sufficiently receive electromagnetic waves from the power transmitter 200 illustrated in FIG. 1 in the current environment. The user can then move the electronic device (the power receiver 100) or move an obstacle between the electronic device and the power transmitter 200 so that the power receiver 100 can sufficiently receive electromagnetic waves from the power transmitter 200.

The power transmitter 200 may perform a process corresponding to the process of step S101. In detail, the power transmitter 200 may determine whether the power receiver 100 is in the contained state. Moreover, the power transmitter 200 may start transmitting electromagnetic waves for power supply to the power receiver 100, triggered by determining that the power receiver 100 is in the contained state. In this case, instead of performing the process of step S101, the controller 31 transmits information of the value of power to be output from the power receiver 100 to the outside via the positive electrode terminal 10 and the like, to the power transmitter 200 via the communication interface 21. Upon acquiring the information of the value of power from the power receiver 100, the power transmitter 200 determines whether the value of power corresponds to the self-discharge of the power receiver 100 or the standby power of the electronic device containing the power receiver 100. In the case where the power transmitter 200 determines that the value of power corresponds to the standby power of the electronic device containing the power receiver 100, the power transmitter 200 starts transmitting electromagnetic waves to the power receiver 100. The controller 31 then performs the process of step S102 onward.

In the process of step S103, the controller 31 may change the emission intensity of the optical emitter 22 depending on the generated power of the power generator 20. For example, in the case where the generated power of the power generator 20 is greater than or equal to the first predetermined value, the controller 31 may set the emission intensity of the optical emitter 22 to greater than or equal to the first value. Hence, the user can recognize the amount of the generated power of the power generator 20 from the change in the emission intensity of the optical emitter 22.

In the process of step S103, the controller 31 may change the emission mode of the optical emitter 22 depending on the generated power of the power generator 20. For example, in the case where the generated power of the power generator 20 is less than the second predetermined value, the controller 31 may cause the optical emitter 22 to flash. Hence, the user can recognize the amount of the generated power of the power generator 20 from the change in the emission mode of the optical emitter 22.

In the process of step S103, the controller 31 may change the emission color of the optical emitter depending on the generated power of the power generator. For example, the controller 31 may set the emission color of the optical emitter 22 to green in the case where the generated power of the power generator 20 is greater than or equal to the first predetermined value, and set the emission color of the optical emitter 22 to red in the case where the generated power of the power generator 20 is less than the first predetermined value. Hence, the user can recognize the amount of the generated power of the power generator 20 from the change in the emission color of the optical emitter 22.

<Authentication Operation>

The authentication operation of the power receiver 100 when communicating with the power transmitter 200 will be described below, with reference to FIG. 6.

First, the controller 31 transmits a pilot signal requesting authentication to the power transmitter 200 via the communication interface 21 (step S201). For example, the controller 31 transmits the pilot signal requesting authentication, triggered by the power receiver 100 entering the contained state. When the power transmitter 200 acquires the pilot signal requesting authentication from the power receiver 100, the power transmitter 200 transmits a signal requesting the identification information for the power receiver 100 to the power receiver 100.

The controller 31 then determines whether the signal requesting the identification information for the power receiver 100 has been acquired from the power transmitter 200 via the communication interface 21 (step S202). In the case where the controller 31 determines that the signal requesting the identification information for the power receiver 100 has been acquired (step S202: Yes), the controller 31 advances to the process of step S203. In the case where the controller 31 determines that the signal requesting the identification information for the power receiver 100 has not been acquired (step S202: No), the controller 31 ends the process.

In the process of step S203, the controller 31 transmits a signal including the identification information for the power receiver 100 to the power transmitter 200 via the communication interface 21. When the power transmitter 200 acquires the signal including the identification information for the power receiver 100 from the power receiver 100, the power transmitter 200 determines whether the identification information for the power receiver 100 is authenticated. In the case where the power transmitter 200 determines that the identification information for the power receiver 100 is authenticated, the power transmitter 200 transmits a signal notifying authentication success to the power receiver 100. The power transmitter 200 further transmits electromagnetic waves for power supply to the power receiver 100.

In the process of step S204, the controller 31 determines whether the signal notifying authentication success has been acquired from the power transmitter 200 via the communication interface 21. In the case where the controller 31 determines that the signal notifying authentication success has been acquired from the power transmitter 200 via the communication interface 21 (step S204: Yes), the controller 31 advances to the process of step S205. In the case where the controller 31 determines that the signal notifying authentication success has not been acquired from the power transmitter 200 via the communication interface 21 (step S204: No), the controller 31 ends the process.

Figure 5:
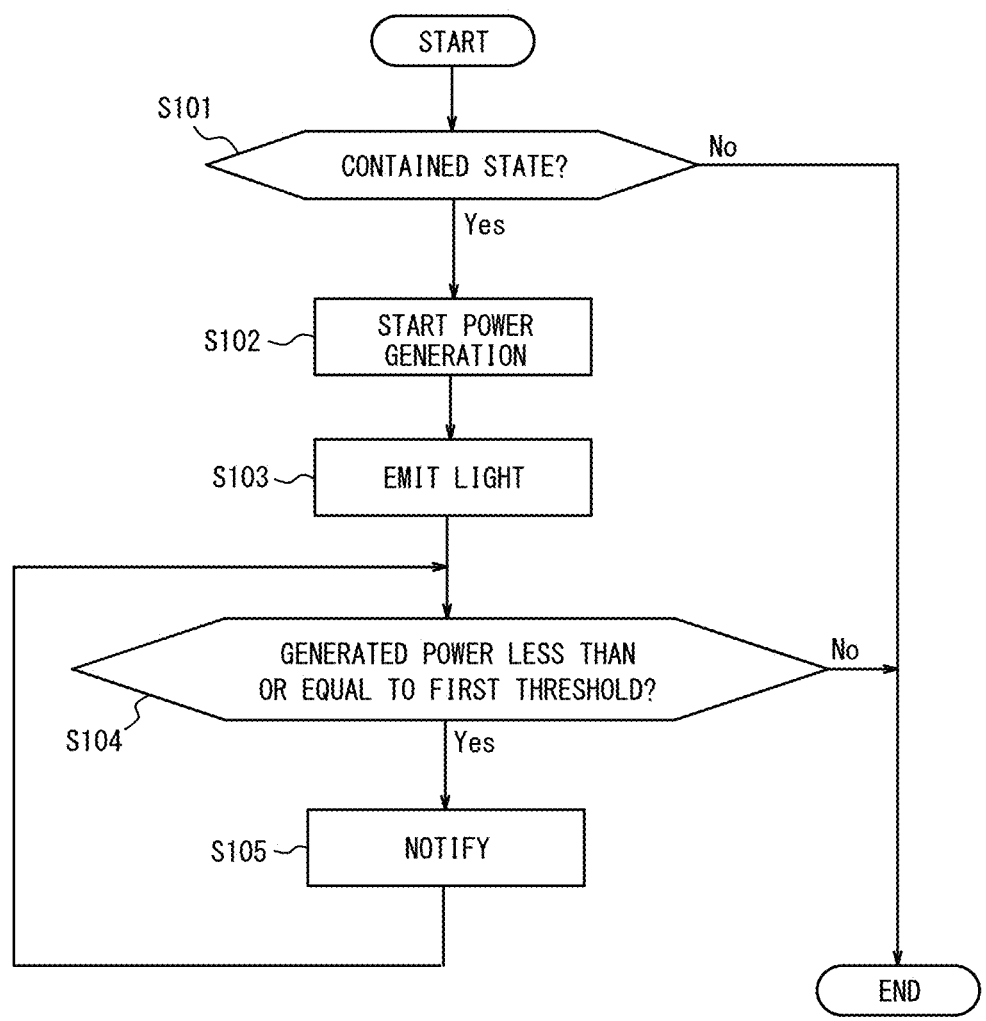
FIG. 5 is a flowchart illustrating the operation of the power receiver according to Embodiment 1 of the present disclosure when generating power.

In the process of step S205, the controller 31 causes the power generator 20 to start power generation, as in the process of step S102 illustrated in FIG. 5.

As described above, the power receiver 100 according to Embodiment 1 can be contained in a battery holder of an electronic device driven by a dry battery or the like. By containing, instead of a dry battery, the power receiver 100 in the battery holder of the electronic device, the electronic device can be supplied with power from the power transmitter 200 illustrated in FIG. 1. Hence, according to this embodiment, an electronic device designed to be driven by a dry battery or the like can be supplied with power by electromagnetic waves. The power supply method can thus be improved according to this embodiment.

Moreover, according to this embodiment, the electronic device can be driven by the power receiver 100, without using a dry battery or the like. Thus, according to this embodiment, a situation in which a dry battery leaks in the electronic device and causes the electronic device to fail can be prevented.

A primary battery such as a dry battery becomes unusable once all dischargeable power is discharged. The primary battery is therefore discarded once all dischargeable power is discharged.

The power receiver 100 according to this embodiment generates power by electromagnetic waves from the power transmitter 200. Accordingly, a situation in which all dischargeable power is discharged, like a primary battery, will not occur in the power receiver 100. Such a power receiver 100 can be used repeatedly and thus is environmentally friendly.

A primary battery such as a dry battery may discharge all dischargeable power by self-discharge. This can cause a situation in which, when the user wants to use the electronic device, the primary battery such as the dry battery in the electronic device is already exhausted. Thus, with the primary battery, there is a possibility that the user cannot use the electronic device.

The power receiver 100 according to this embodiment generates power by electromagnetic waves from the power transmitter 200. Accordingly, the power receiver 100 can generate power by electromagnetic waves from the power transmitter 200, when the user wants to use the electronic device. A situation in which the user cannot use the electronic device when the user wants to use the electronic device, like a primary battery, will not occur in the power receiver 100 according to this embodiment. The power receiver 100 according to this embodiment is therefore very convenient for the user.

(Alternative Structure of Embodiment 1)

An alternative structure of the power receiver according to Embodiment 1 will be described below, with reference to FIG. 7. The same components in FIG. 7 as the components in FIG. 3 are given the same reference signs, and their description is omitted. The optical emitter 22 is not illustrated in FIG. 7.

A power receiver 100a includes the positive electrode terminal 10, the negative electrode terminal 11, the top surface 12, the bottom surface 13, and a body 14A.

The body 14A includes an upper portion 14a and a lower portion 14b. The upper portion 14a and the lower portion 14b constitute an extension mechanism. When the lower portion 14b is rotated in the direction indicated by arrow A, the upper portion 14a extends in the vertical direction indicated by arrow B. When the lower portion 14b is rotated in the direction opposite to the direction indicated by arrow A, the upper portion 14a contracts in the direction opposite to the vertical direction indicated by arrow B.

With such a structure, the distance L1 can be adjusted for various battery holders. In other words, the power receiver 100a can be contained in a battery holder for D size dry batteries to a battery holder for N size dry batteries.

The other effects and functions of the power receiver 100a according to the alternative structure of Embodiment 1 are the same as those of the power receiver 100 according to Embodiment 1.

Embodiment 2

A power receiver 100b according to Embodiment 2 will be described below. The following description mainly focuses on the differences from the power receiver 100 according to Embodiment 1.

Figure 8:
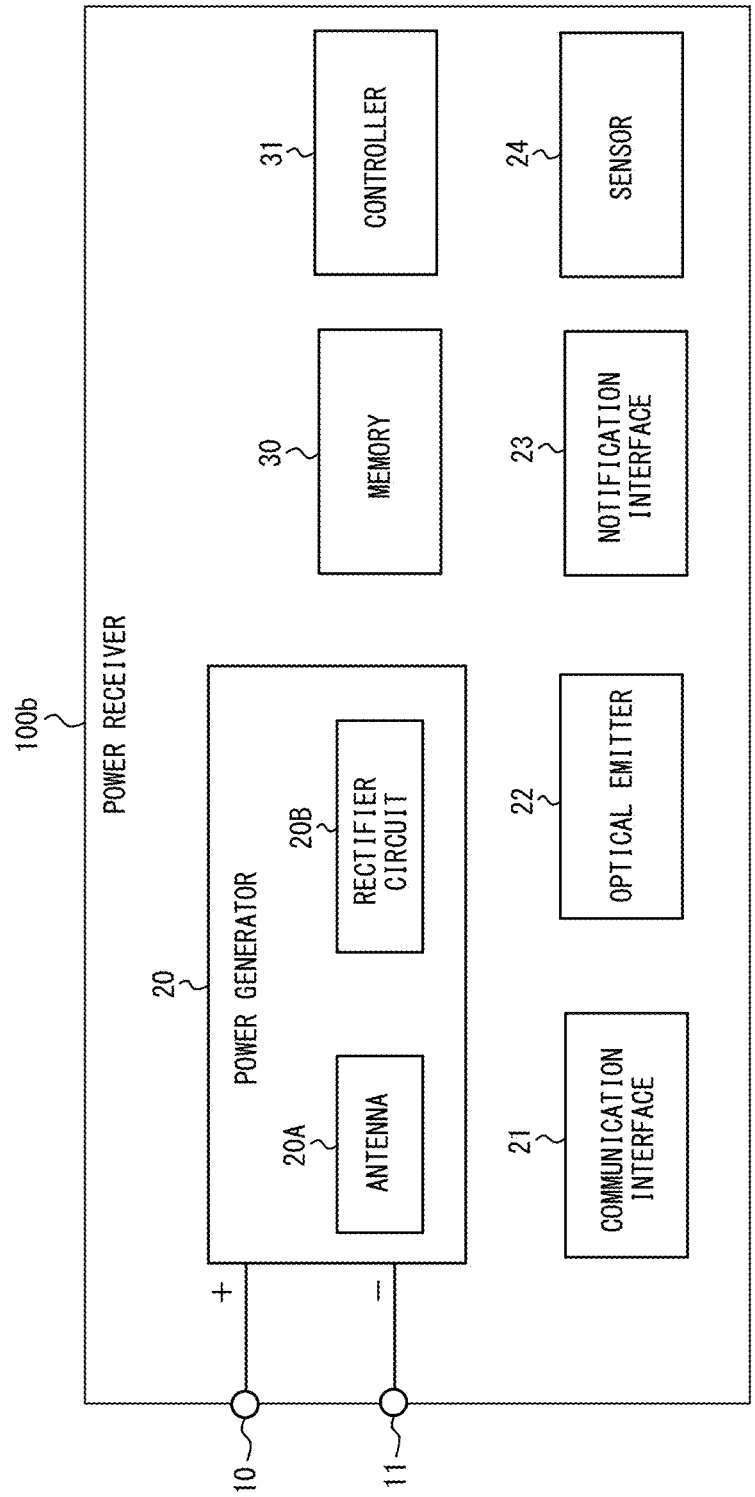
FIG. 8 is a functional block diagram of a power receiver according to Embodiment 2 of the present disclosure.

FIG. 8 is a functional block diagram of the power receiver 100b according to Embodiment 2 of the present disclosure. The same components in FIG. 8 as the components in FIG. 4 are given the same reference signs, and their description is omitted.

The power receiver 100b includes the power generator 20, the communication interface 21, the optical emitter 22, the notification interface 23, a sensor 24, the memory 30, and the controller 31.

The sensor 24 detects that the power receiver 100 is in the contained state (see FIG. 2). The sensor 24 includes, for example, a pressure sensor or a conduction sensor.

Figure 3:
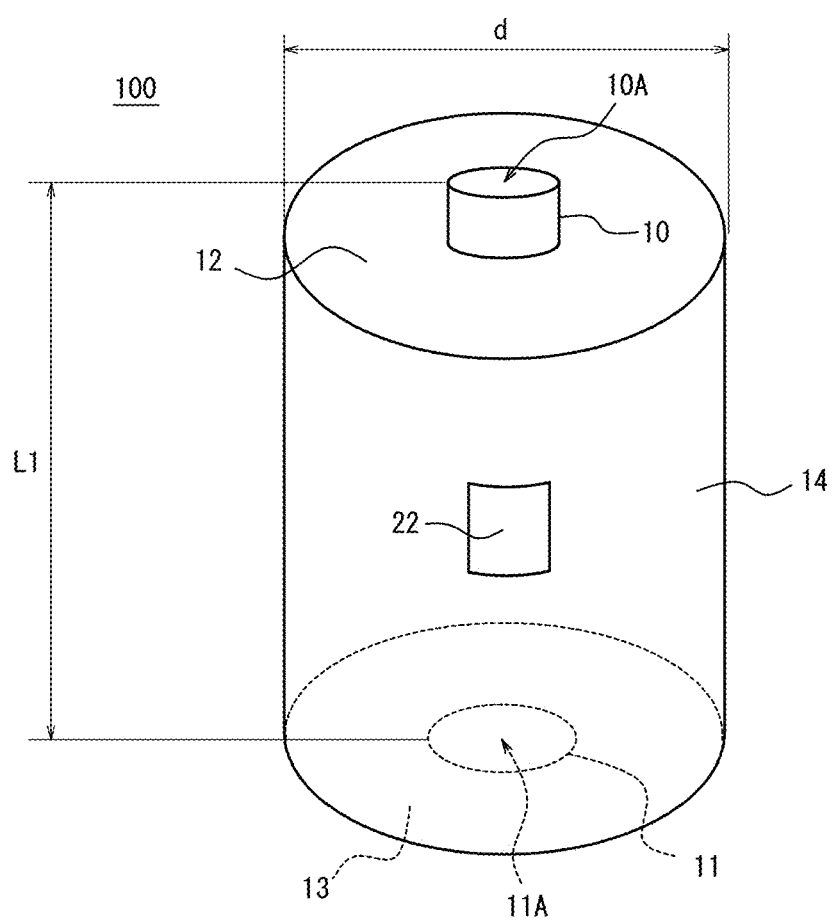
FIG. 3 is an external perspective diagram of the power receiver according to Embodiment 1 of the present disclosure.

For example, in the case where the sensor 24 includes a pressure sensor, the sensor 24 detects pressure applied across the first contact portion 10A and the second contact portion 11A illustrated in FIG. 3. In the case where pressure applied across the first contact portion 10A and the second contact portion 11A rises above a second threshold, the sensor 24 notifies the controller 31 of the detection of pressure.

For example, in the case where the sensor 24 includes a conduction sensor, the sensor 24 detects conduction between the first contact portion 10A and the second contact portion 11A illustrated in FIG. 3. In the case where the sensor 24 detects conduction between the first contact portion 10A and the second contact portion 11A, the sensor 24 notifies the controller 31 of the detection of conduction.

The controller 31 according to Embodiment 2 executes a power generation process different from the power generation process described in the power generation process in Embodiment 1. The power generation process according to Embodiment 2 will be described in the following power generation process.

<Power Generation Process>

In the case where the controller 31 determines, by the sensor 24, that the power receiver 100 is in the contained state, the controller 31 causes the power generator 20 to generate power. This process will be described below, separately for (1) the case in which the sensor 24 includes a pressure sensor and (2) the case in which the sensor 24 includes a conduction sensor.

(1) The Case in which the Sensor 24 Includes a Pressure Sensor

When the power receiver 100b is in the contained state illustrated in FIG. 2, the first contact portion 10A is in contact with the terminal 2C on the positive electrode side of the electronic device, and the second contact portion 11A is in contact with the terminal 2D on the negative electrode side of the electronic device. Accordingly, when the power receiver 100b is in the contained state, the first contact portion 10A is subjected to pressure from the terminal on the positive electrode side of the electronic device, and the second contact portion 11A is subjected to pressure from the terminal on the negative electrode side of the electronic device. Hence, in the case where the controller 31 determines that pressure is applied across the first contact portion 10A and the second contact portion 11A, the controller 31 determines that the power receiver 100 is in the contained state. For example, in the case where the controller 31 is notified of the detection of pressure from the sensor 24, the controller 31 determines that a pressure rising above the second threshold is being applied across the first contact portion 10A and the second contact portion 11A.

A member to be stretched and compressed may be used on the exterior of the power receiver 100b, in order to detect pressure applied across the first contact portion 10A and the second contact portion 11A more easily. In this case, the distance L1 (see FIG. 2) between the first contact portion 10A and the second contact portion 11A when the power receiver 100b is in the contained state is set to correspond to the height defined in the foregoing predetermined standard.

(2) The Case in which the Sensor 24 Includes a Conduction Sensor

When the power receiver 100b is in the contained state illustrated in FIG. 2, the first contact portion 10A is electrically connected to the terminal 2C on the positive electrode side of the electronic device, and the second contact portion 11A is electrically connected to the terminal 2D on the negative electrode side of the electronic device. Accordingly, when the power receiver 100b is in the contained state, the first contact portion 10A and the second contact portion 11A are in conduction with each other. Hence, in the case where the controller 31 determines that the first contact portion 10A and the second contact portion 11A are in conduction with each other, the controller 31 determines that the power receiver 100 is in the contained state. For example, in the case where the controller 31 is notified of the detection of conduction from the sensor 24, the controller 31 determines that the first contact portion 10A and the second contact portion 11A are in conduction with each other.

[System Operation]
<Power Generation Operation>

Figure 9:
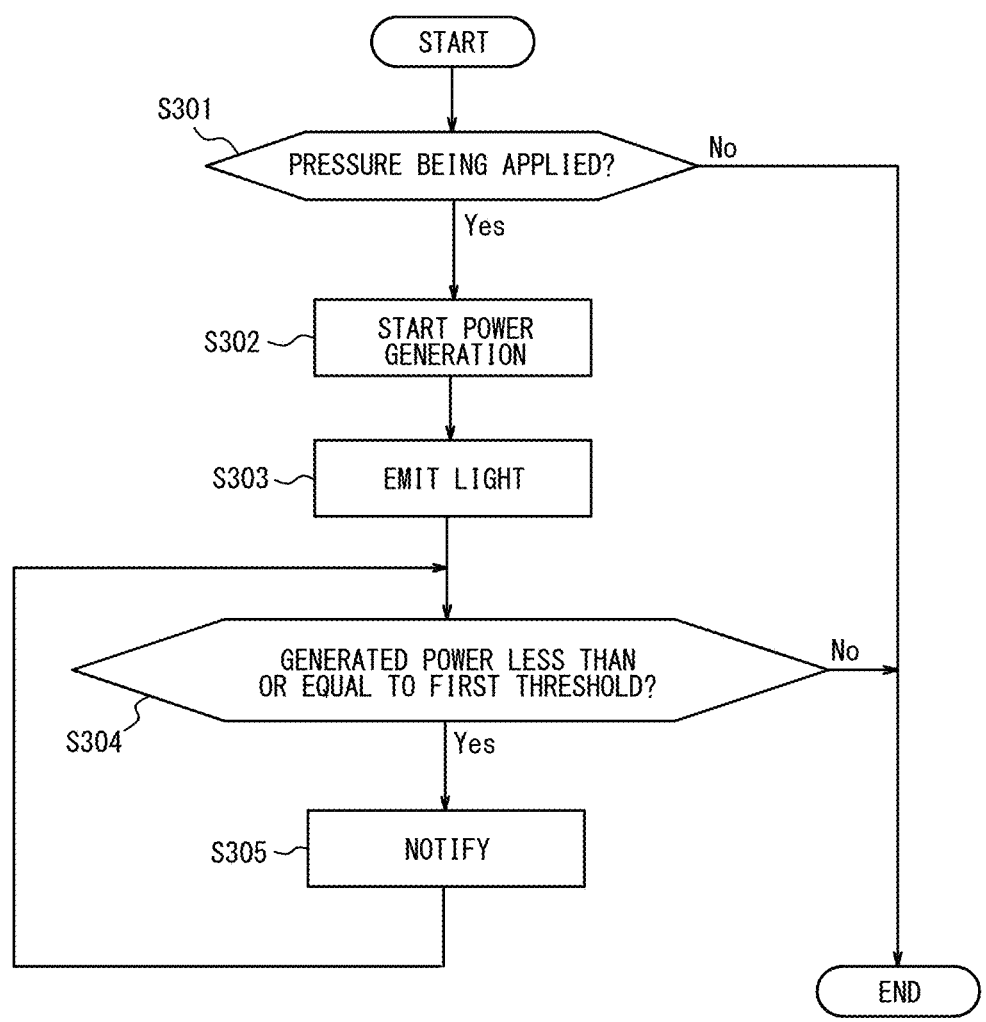
FIG. 9 is a flowchart illustrating the operation of the power receiver according to Embodiment 2 of the present disclosure when generating power.

The operation of the power receiver 100b according to Embodiment 2 when generating power will be described below, with reference to FIG. 9. It is assumed here that the sensor 24 includes a pressure sensor.

First, the controller 31 determines whether pressure is applied across the first contact portion 10A and the second contact portion 11A illustrated in FIG. 3 (step S301). In the case where the controller 31 is notified of the detection of pressure from the sensor 24, the controller 31 determines that pressure is applied across the first contact portion 10A and the second contact portion 11A.

In the case where the controller 31 determines that pressure is applied across the first contact portion 10A and the second contact portion 11A (step S301: Yes), the controller 31 advances to the process of step S302. In the case where the controller 31 determines that pressure is not applied across the first contact portion 10A and the second contact portion 11A (step S301: No), the controller 31 ends the process.

The processes of steps S302 to S305 are the same as the processes of steps S102 to S105 illustrated in FIG. 5, and accordingly their description is omitted.

In the case where the sensor 24 includes a conduction sensor, in the process of step S301, the controller 31 determines whether the first contact portion 10A and the second contact portion 11A are in conduction with each other. In the case where the controller 31 is notified of the detection of conduction from the sensor 24, the controller 31 determines that the first contact portion 10A and the second contact portion 11A are in conduction with each other.

The other effects and functions of the power receiver 100b according to Embodiment 2 are the same as those of the power receiver 100 according to Embodiment 1.

Embodiment 3

A power receiver 100c according to Embodiment 3 will be described below. The following description mainly focuses on the differences from the power receiver 100 according to Embodiment 1.

Figure 10:
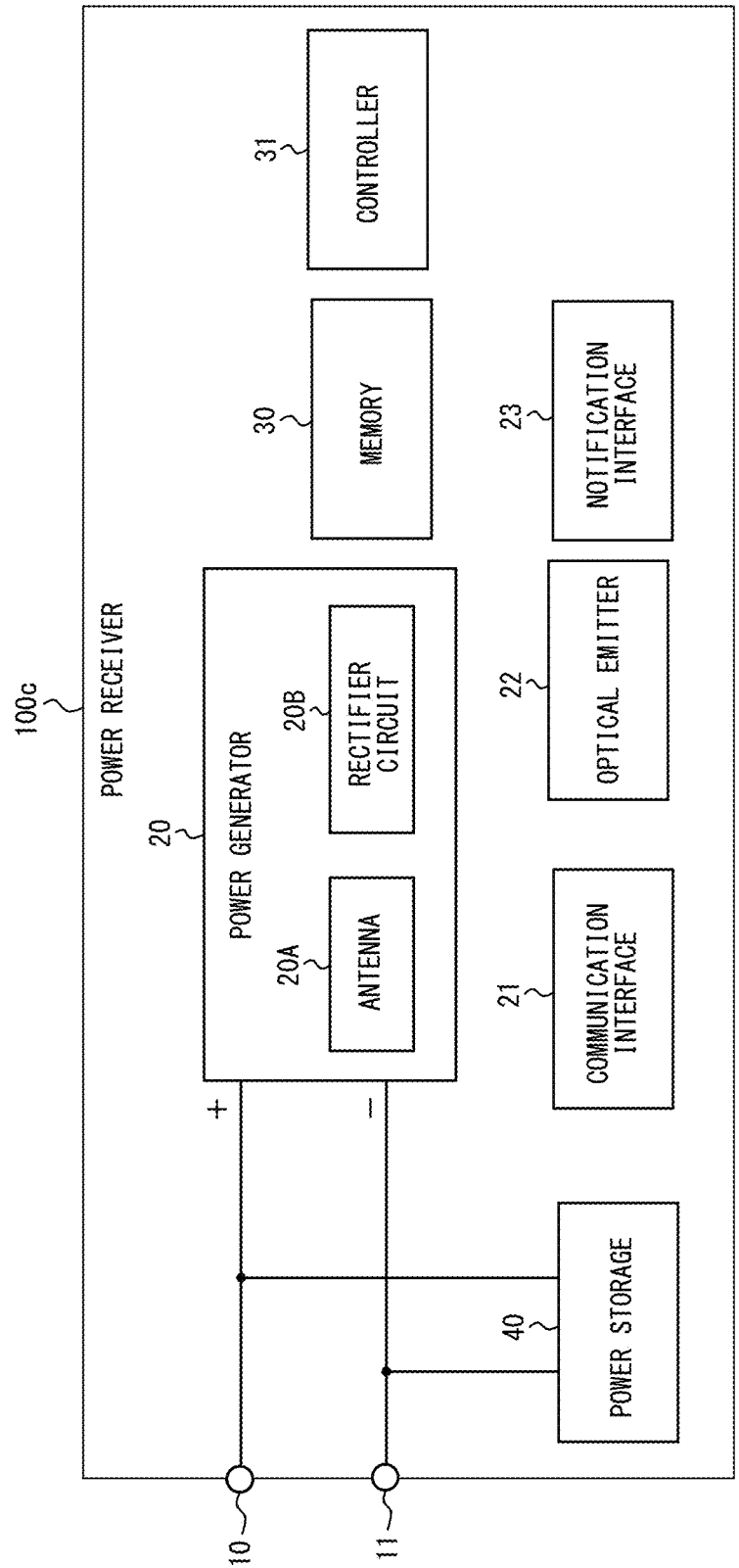
FIG. 10 is a functional block diagram of a power receiver according to Embodiment 3 of the present disclosure.

FIG. 10 is a functional block diagram of the power receiver 100c according to Embodiment 3 of the present disclosure. The same components in FIG. 10 as the components in FIG. 4 are given the same reference signs, and their description is omitted.

The power receiver 100c includes the power generator 20, the communication interface 21, the optical emitter 22, the notification interface 23, the memory 30, the controller 31, and a power storage 40.

The power storage 40 is electrically connected to the positive electrode terminal 10 and the negative electrode terminal 11, and also electrically connected to the power generator 20. The power storage 40 is capable of storing generated power not supplied to the electronic device (hereafter referred to as "surplus power") from among the generated power of the power generator 20.

In Embodiment 3, the controller 31 may request to supply power depending on the remaining level of the power storage 40 to the power transmitter 200 via the communication interface 2, during power generation by the power generator 20. For example, in the case where the controller 31 determines that the remaining level of the power storage 40 is less than or equal to a third threshold, the controller 31 transmits a pilot signal including a signal for switching the operation mode of the power transmitter 200 to high power mode, to the power transmitter 200 via the communication interface 21. For example, in the case where the controller 31 determines that the remaining level of the power storage 40 rises above the third threshold, the controller 31 transmits a pilot signal including a signal for switching the operation mode of the power transmitter 200 to low power mode, to the power transmitter 200 via the communication interface 21.

In Embodiment 3, upon receiving the pilot signal including the signal for switching the operation mode of the power transmitter 200 to high power mode from the power receiver 100c, the power transmitter 200 switches the operation mode to transmit stronger electromagnetic waves than the current electromagnetic waves. Upon receiving the pilot signal including the signal for switching the operation mode of the power transmitter 200 to low power mode from the power receiver 100c, the power transmitter 200 switches the operation mode to transmit weaker electromagnetic waves than the current electromagnetic waves.

[System Operation]
<Power Generation Operation>

Figure 11:
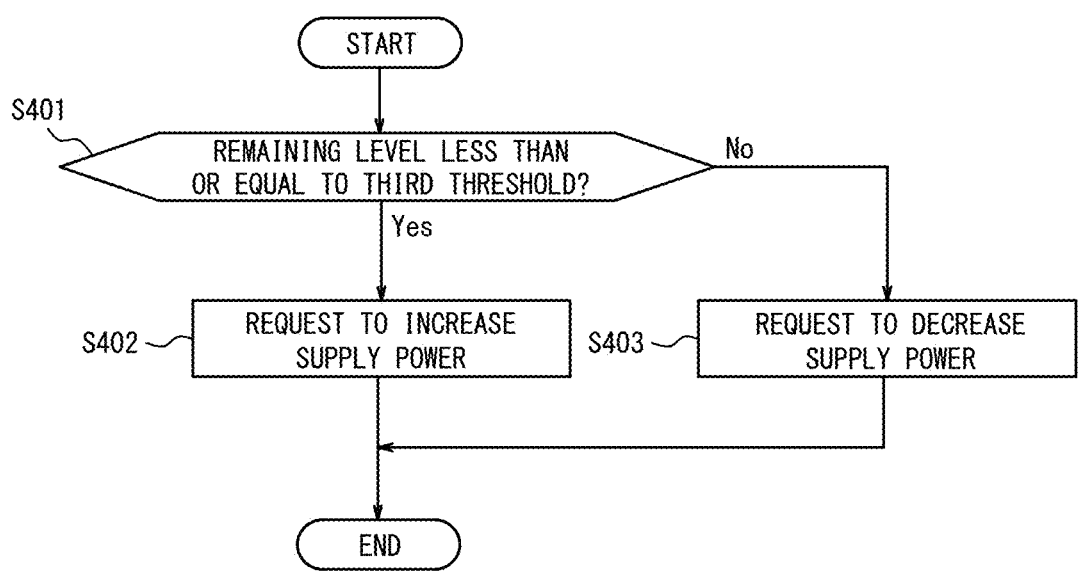
FIG. 11 is a flowchart illustrating the operation of the power receiver according to Embodiment 3 of the present disclosure.

Operation of the power receiver 100c according to Embodiment 3 during power generation will be described below, with reference to FIG. 11.

First, the controller 31 determines whether the remaining level of the power storage 40 is less than or equal to the third threshold (step S401). In the case where the controller 31 determines that the remaining level of the power storage 40 is less than or equal to the third threshold (step S401: Yes), the controller 31 advances to the process of step S402. In the case where the controller 31 determines that the remaining level of the power storage 40 rises above the third threshold (step S401: No), the controller 31 advances to the process of step S403.

In the process of step S402, the controller 31 transmits a pilot signal including a signal for switching the operation mode of the power transmitter 200 to high power mode, to the power transmitter 200 via the communication interface 21.

With such processes of steps S401 and S402, in the case where the remaining level of the power storage 40 is less than or equal to the third threshold, the power receiver 100 transmits a pilot signal including a signal for switching the operation mode of the power transmitter 200 to high power mode, to the power transmitter 200. The power transmitter 200 is thus switched to a mode of transmitting stronger electromagnetic waves than the current electromagnetic waves. Consequently, the power storage 40 can be charged quickly.

In the process of step S403, the controller 31 transmits a pilot signal including a signal for switching the operation mode of the power transmitter 200 to low power mode, to the power transmitter 200 via the communication interface 21.

With such processes of steps S401 and S403, in the case where the remaining level of the power storage 40 rises above the third threshold, the power receiver 100 transmits a pilot signal including a signal for switching the operation mode of the power transmitter 200 to low power mode, to the power transmitter 200. The power transmitter 200 is thus switched to a mode of transmitting weaker electromagnetic waves than the current electromagnetic waves. Consequently, the power consumption of the power transmitter 200 can be reduced.

Although the above describes an example of adding the power storage 40 to the functions of the power receiver 100 according to Embodiment 1 (see FIG. 4), the power storage 40 may be added to the functions of the power receiver 100b according to Embodiment 2 (see FIG. 8).

The other effects and functions of the power receiver 100c according to Embodiment 3 are the same as those of the power receiver 100 according to Embodiment 1.

Embodiment 4

Embodiment 4 will be described below. The following description mainly focuses on the differences from Embodiment 1.

Embodiments 1 to 3 describe the power receiver 100 and the like that can be contained in the battery holder 2A as illustrated in FIG. 2. Embodiment 4 describes an adapter that can be contained in a battery holder.

Figure 12:
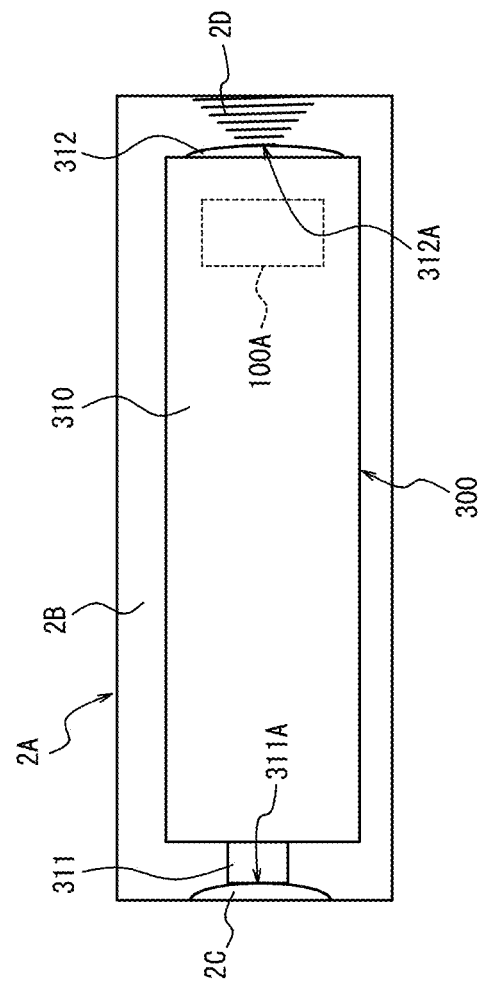
FIG. 12 is a diagram illustrating a state in which an adapter according to Embodiment 4 of the present disclosure is contained in the battery holder of the remote control illustrated in FIG. 2.

FIG. 12 illustrates a state in which an adapter 300 according to Embodiment 4 of the present disclosure is contained in the battery holder 2A of the remote control 2 illustrated in FIG. 2. The same components in FIG. 12 as the components in FIG. 2 are given the same reference signs, and their description is omitted.

The adapter 300 contains a power receiver 100A, as illustrated in FIG. 12. In FIG. 12, the power receiver 100A contained in the adapter 300 is indicated by dashed lines. The power receiver 100A is, for example, chip-shaped. The power receiver 100A is capable of the same functions as the power receiver 100 and the like according to the foregoing Embodiments 1 to 3. The power receiver 100A receives electromagnetic waves for power supply, from the power transmitter 200 illustrated in FIG. 1. The power receiver 100A converts the received electromagnetic waves into direct-current (DC) power. The power receiver 100A supplies the DC power resulting from the conversion, to the adapter 300.

When the adapter 300 is fitted into the battery holder 2A, a first output interface 311 of the adapter 300 is electrically connected to the terminal 2C on the positive side, and a second output interface 312 of the adapter 300 is electrically connected to the terminal 2D on the negative side.

The adapter 300 supplies the DC power from the power receiver 100A to the remote control 2 via a first output interface 311 connected to the terminal 2C on the positive side of the remote control 2 and a second output interface 312 connected to the terminal 2D on the negative side of the remote control 2, as illustrated in FIG. 12.

The adapter 300 can also emit a pilot signal for positioning. This process will be described later.

In Embodiment 4, the remote control 2 illustrated in FIG. 1 is driven by power supplied from the power receiver 100A via the adapter 300. As in Embodiment 1, electronic devices that can be driven by power supplied from the power receiver 100A are not limited to the remote control 2. Electronic devices that can be driven by power supplied from the power receiver 100A may be any electronic devices that can be driven by power supplied from a dry battery. Examples include a clock, a mouse, and an electronic dictionary.

In Embodiment 4, the power transmitter 200 illustrated in FIG. 1 may receive a pilot signal for positioning from, for example, another device that can receive electromagnetic waves for power supply. Upon receiving the pilot signal for positioning, the power transmitter 200 may transmit electromagnetic waves for power supply in a plurality of arrival directions of the received pilot signal. Such a process can improve the efficiency of power transmission from the power transmitter 200 to the other device. This principle will be briefly described below.

For example, suppose the other device that can receive electromagnetic waves for power supply is the adapter 300 containing the power receiver 100A. When the adapter 300 emits a pilot signal for positioning, the pilot signal reflects on walls and the like in the room and arrives at the power transmitter 200 by multipath. Upon receiving a plurality of pilot signals, the power transmitter 200 transmits electromagnetic waves for power supply in a plurality of arrival directions of the received pilot signals. The electromagnetic waves for power supply travel in reverse through each path of the pilot signal, and arrive at the adapter 300. Thus, the electromagnetic waves concentrate in the adapter 300 containing the power receiver 100A. This improves the efficiency of power transmission from the power transmitter 200 to the power receiver 100A.

Figure 13:
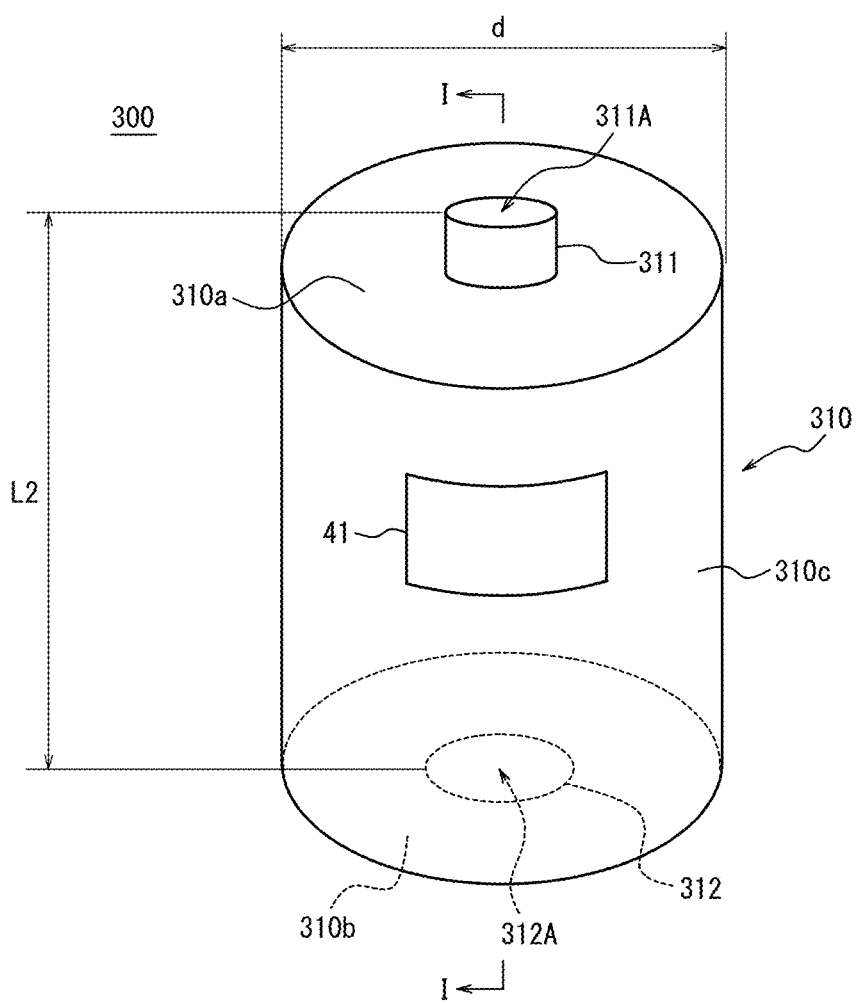
FIG. 13 is an external perspective diagram of the adapter according to Embodiment 4 of the present disclosure.
Figure 14:
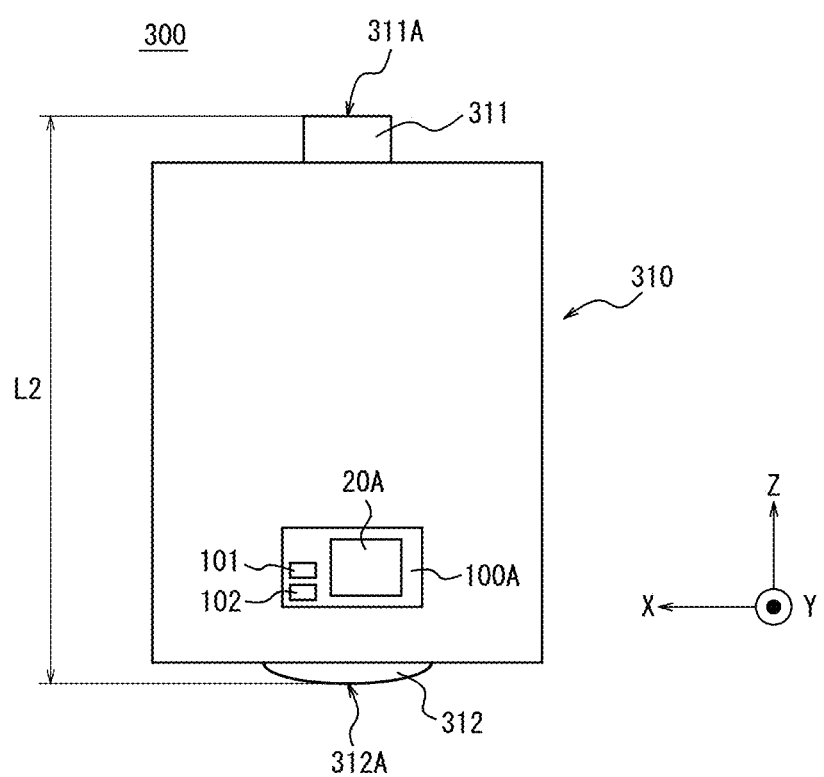
FIG. 14 is a sectional diagram of the adapter illustrated in FIG. 13 along line I-I.

The structures of the power receiver 100A and the adapter 300 will be described below, with reference to FIGS. 13 and 14. FIG. 13 is an external perspective diagram of the adapter 300. FIG. 14 is a sectional diagram of the adapter 300 illustrated in FIG. 13 along line I-I.

The power receiver 100A is, for example, chip-shaped as illustrated in FIG. 14. For example, the power receiver 100A is smaller than an N size dry battery. The power receiver 100A is contained in the adapter 300. The power receiver 100A includes a positive electrode terminal 101, a negative electrode terminal 102, and an antenna (first antenna) 20A.

The positive electrode terminal 101 functions as a positive electrode when outputting power generated by the power receiver 100A to the outside. The negative electrode terminal 102A functions as a negative electrode when outputting power generated by the power receiver 100A to the outside.

The antenna 20A receives electromagnetic waves from the power transmitter 200 illustrated in FIG. 1. In the power receiver 100A, the electromagnetic waves received by the antenna 20A are converted into DC power, to generate power.

The adapter 300 includes a container 310, the first output interface 311, the second output interface 312, and an antenna (second antenna) 41, as illustrated in FIG. 13.

The container 310 contains the power receiver 100A, as illustrated in FIG. 14. The container 310 includes a top surface 310a, a bottom surface 310b, and a body 310c.

The top surface 310a is located to cover the top of the body 310c, as illustrated in FIG. 13. The first output interface 311 is located in the center part of the top surface 310a. The shape of the top surface 310a may be any shape depending on the shape of the body 310c. For example, the shape of the top surface 310a may be circular, triangular, or hexagonal depending on the shape of the body 310c.

The bottom surface 310b is located to cover the bottom of the body 310c, as illustrated in FIG. 13. The second output interface 312 is located in the center part of the bottom surface 310b. The shape of the bottom surface 310b may be circular, triangular, or hexagonal depending on the shape of the body 310c.

The body 310c is columnar. The top surface 310a is located on the top side of the body 310c. The bottom surface 310b is located on the bottom side of the body 310c. The power receiver 100A is located inside the body 310c, as illustrated in FIG. 14. The shape of the body 310c may be any shape. For example, the shape of the body 310c may be a cylinder, a triangular prism, or a hexagonal prism.

A part of the container 310 located in the direction in which the antenna 20A faces may have an opening. This improves the efficiency of power reception by the antenna 20A.

For example, in the case where, as illustrated in FIG. 14, the antenna 20A is located to face the positive direction of the Y axis illustrated in FIG. 14, the body 310c located in the direction in which the antenna 20A faces may have an opening. In the case where the antenna 20A is located to face the positive direction of the Z axis illustrated in FIG. 14, the top surface 310a located in the direction in which the antenna 20A faces may have an opening. In the case where the antenna 20A is located to face the negative direction of the Z axis illustrated in FIG. 14, the bottom surface 310b located in the direction in which the antenna 20A faces may have an opening.

The area of the opening may be approximately equal to the area of the antenna 20A. Alternatively, the area of the opening may be larger than the area of the antenna 20A.

The material of a part of the container 310 located in the direction in which the antenna 20A faces may be a material (non-metallic material) that allows electromagnetic waves to pass through. This improves the efficiency of power reception by the antenna 20A.

For example, in the case where, as illustrated in FIG. 14, the antenna 20A is located to face the positive direction of the Y axis illustrated in FIG. 14, the material of the body 310c located in the direction in which the antenna 20A faces may be a material that allows electromagnetic waves to pass through. In the case where the antenna 20A is located to face the positive direction of the Z axis illustrated in FIG. 14, the material of the top surface 310a located in the direction in which the antenna 20A faces may be a material that allows electromagnetic waves to pass through. In the case where the antenna 20A is located to face the negative direction of the Z axis illustrated in FIG. 14, the material of the bottom surface 310b located in the direction in which the antenna 20A faces may be a material that allows electromagnetic waves to pass through.

The area of the part having the material that allows electromagnetic waves to pass through may be approximately equal to the area of the antenna 20A. Alternatively, the area of the part may be larger than the area of the antenna 20A.

The first output interface 311 has, for example, a convex shape. The first output interface 311 is located at the center of the top surface 310a. The second output interface 312 has, for example, an approximately planar shape. The second output interface 312 is located at the center of the bottom surface 310b. The first output interface 311 and the second output interface 312 output power generated by the power receiver 100A to the external electronic device.

The first output interface 311 is electrically connected to the positive electrode terminal 101 of the power receiver 100A illustrated in FIG. 14. The first output interface 311 includes a first contact portion 311A. The first contact portion 311A is electrically connected to the terminal 2C on the positive electrode side of the electronic device, as illustrated in FIG. 12. The second output interface 312 is electrically connected to the negative electrode terminal 102 of the power receiver 100A illustrated in FIG. 14. The second output interface 312 includes a second contact portion 312A. The second contact portion 312A is electrically connected to the terminal 2D on the negative electrode side of the electronic device, as illustrated in FIG. 12. With such a structure, power generated by the power receiver 100A is supplied to the electronic device via the positive electrode terminal 101 and the negative electrode terminal 102, the first contact portion 311A and the second contact portion 312A, and the terminals of the electronic device (the terminals 2C and 2D in FIG. 12).

In this embodiment, the distance L2 between the first contact portion 311A and the second contact portion 312A corresponds to a height defined in a predetermined standard relating to primary batteries. Examples of the predetermined standard include IEC 60086 which is a standard relating to primary batteries defined by the International Electrotechnical Commission (IEC), and JIS C 8500 which is a standard in Japan corresponding to IEC 60086. This enables the positive electrode terminal 101 of the power receiver 100A to be connected to the terminal 2C via the first contact portion 311A, and the negative electrode terminal 102 of the power receiver 100A to be connected to the terminal 2D via the second contact portion 312A.

For example, in the case where the distance L2 is fixed to 59.5 mm to 61.5 mm which are the heights of D size dry batteries, the adapter 300 containing the power receiver 100A can be contained in a battery holder for D size dry batteries in an electronic device, and the power receiver 100A can be used to drive the electronic device. For example, in the case where the distance L2 is fixed to 48.6 mm to 50.0 mm which are the heights of C size dry batteries, the adapter 300 containing the power receiver 100A can be contained in a battery holder for C size dry batteries in an electronic device, and the power receiver 100A can be used to drive the electronic device. For example, in the case where the distance L2 is fixed to 49.2 mm to 50.5 mm which are the heights of AA size dry batteries, the adapter 300 containing the power receiver 100A can be contained in a battery holder for AA size dry batteries in an electronic device, and the power receiver 100A can be used to drive the electronic device. For example, in the case where the distance L2 is fixed to 43.3 mm to 44.5 mm which are the heights of AAA size dry batteries, the adapter 300 containing the power receiver 100A can be contained in a battery holder for AAA size dry batteries in an electronic device, and the power receiver 100A can be used to drive the electronic device. For example, in the case where the distance L2 is fixed to 29.1 mm to 30.2 mm which are the heights of N size dry batteries, the adapter 300 containing the power receiver 100A can be contained in a battery holder for N size dry batteries in an electronic device, and the power receiver 100A can be used to drive the electronic device. For example, in the case where the distance L2 is fixed to about 3.2 mm which is the height of button batteries, the adapter 300 containing the power receiver 100A can be contained in a battery holder for button batteries in an electronic device, and the power receiver 100A can be used to drive the electronic device.

The diameter d of the body 310c may correspond to a diameter defined in a predetermined standard relating to primary batteries, based on the electronic device in which the adapter 300 is contained. Examples of the predetermined standard include IEC 60086 and JIS C 8500. Thus, the adapter 300 can be fitted without gaps into the battery holder.

For example, in the case where the diameter d is fixed to 32.2 mm to 34.2 mm which are the diameters of D size dry batteries, the adapter 300 can be fitted without gaps into a battery holder for D size dry batteries. For example, in the case where the diameter d is fixed to 24.7 mm to 26.2 mm which are the diameters of C size dry batteries, the adapter 300 can be fitted without gaps into a battery holder for C size dry batteries. For example, in the case where the diameter d is fixed to 13.5 mm to 14.5 mm which are the diameters of AA size dry batteries, the adapter 300 can be fitted without gaps into a battery holder for AA size dry batteries. For example, in the case where the diameter d is fixed to 9.5 mm to 10.5 mm which are the diameters of AAA size dry batteries, the adapter 300 can be fitted without gaps into a battery holder for AAA size dry batteries. For example, in the case where the diameter d is fixed to 7.7 mm to 8.3 mm which are the diameters of N size dry batteries, the adapter 300 can be fitted without gaps into a battery holder for N size dry batteries. For example, in the case where the diameter d is fixed to about 20 mm which is the diameter of button batteries, the adapter 300 can be fitted without gaps into a battery holder for button batteries.

With the adapter 300 according to Embodiment 4, the chip-shaped small power receiver 100A illustrated in FIG. 14 can be contained in a battery holder of an electronic device. By containing, instead of a dry battery, the power receiver 100A in the battery holder of the electronic device, the electronic device can be supplied with power from the power transmitter 200 illustrated in FIG. 1. Hence, according to this embodiment, an electronic device designed to be driven by a dry battery or the like can be supplied with power by electromagnetic waves. The power supply method can thus be improved according to this embodiment.

The antenna 41 illustrated in FIG. 13 is an antenna capable of communicating with the power transmitter 200 illustrated in FIG. 1. The area of the antenna 41 is larger than that of the antenna 20A of the power receiver 100A.

The antenna 41 is located on the outside of the container 310. For example, the antenna 41 is located on the outside of the body 310c, as illustrated in FIG. 13. The antenna 41 may be located on the outside of the top surface 310a, or located on the outside of the bottom surface 310b.

Figure 15:
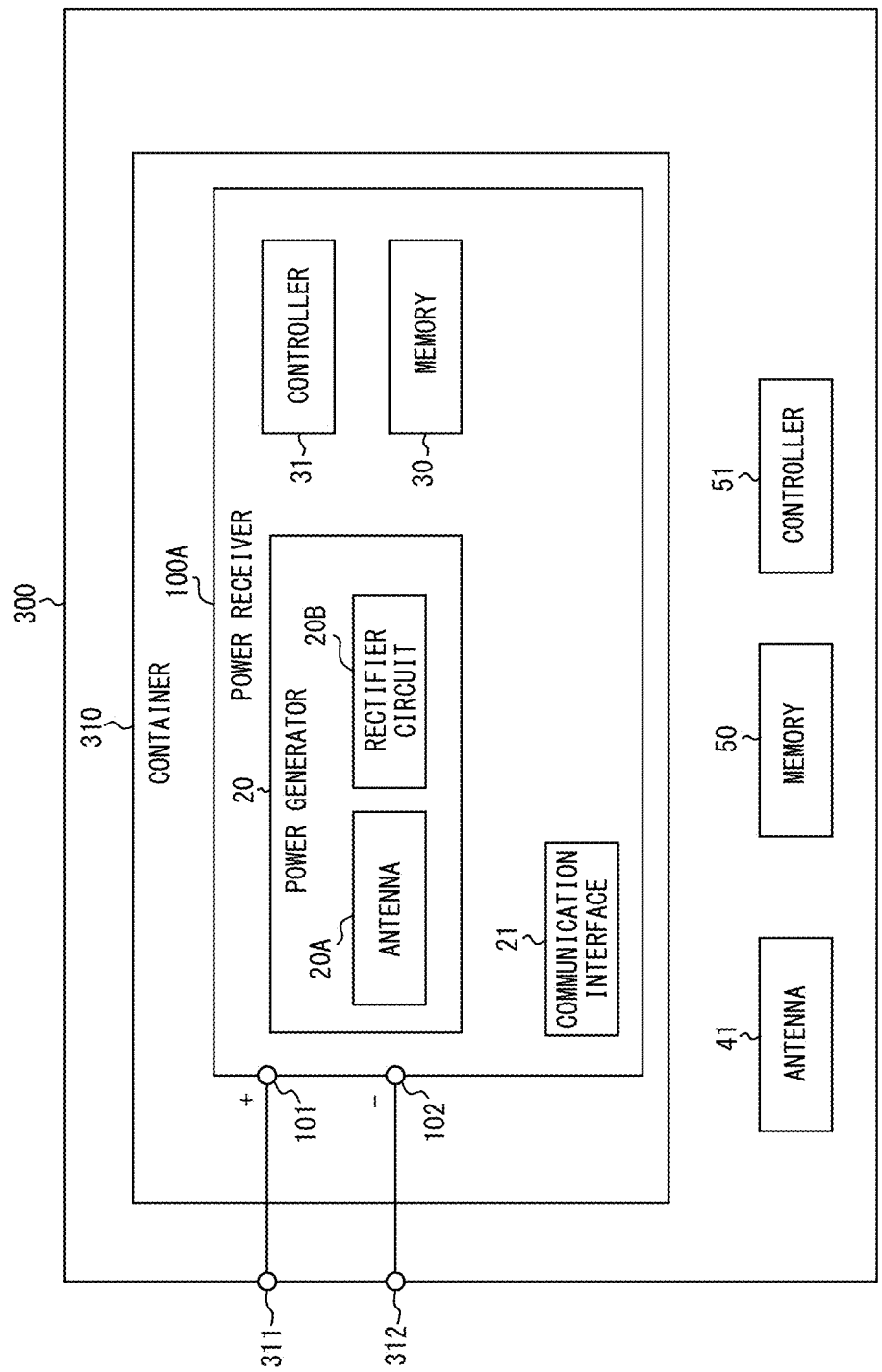
FIG. 15 is a functional block diagram of the adapter according to Embodiment 4 of the present disclosure.

The functions of the power receiver 100A and the adapter 300 will be described below, with reference to FIG. 15. The same components in FIG. 15 as the components in FIG. 4 are given the same reference signs, and their description is omitted.

The functions of the power receiver 100A will be described first. The power receiver 100A includes the power generator 20, the communication interface 21, the memory 30, and the controller 31.

The power generator 20 generates power by electromagnetic waves from the power transmitter 200 illustrated in FIG. 1, as in Embodiment 1. The power generator 20 supplies the generated power to the adapter 300 via the positive electrode terminal 101 and the negative electrode terminal 102. The power generator 20 includes the antenna (first antenna) 20A and the rectifier circuit 20B.

The antenna 20A receives electromagnetic waves from the power transmitter 200 illustrated in FIG. 1, as in Embodiment 1. The rectifier circuit 20B converts the electromagnetic waves received by the antenna 20A into DC power. The rectifier circuit 20B supplies the DC power resulting from the conversion, to the external electronic device via the positive electrode terminal 101 and the negative electrode terminal 102.

The controller 31 performs authentication with the power transmitter 200 as described in the authentication process in Embodiment 1.

The functions of the adapter 300 will be described next. The adapter 300 includes the container 310, the first output interface 311, the second output interface 312, the antenna (second antenna) 41, a memory 50, and a controller 51.

The container 310 contains the power receiver 100A. When the power receiver 100A is contained in the container 310, the first output interface 311 is electrically connected to the positive electrode terminal 101 of the power receiver 100A, and the second output interface 312 is electrically connected to the negative electrode terminal 102 of the power receiver 100A.

In the case where authentication is performed between the power receiver 100A and the power transmitter 200, when the controller 31 completes authentication with the power transmitter 200, the power generator 20 starts power generation. Once the power generator 20 starts power generation, power is output from the first output interface 311 and the second output interface 312 to the external electronic device.

In the case where the power transmitter 200 is designed to transmit electromagnetic waves for power supply to the power receiver without performing authentication with the power receiver, after the power receiver 100A is contained in the container 310, power is output from the first output interface 311 and the second output interface 312 to the electronic device.

The antenna 41 is, for example, a planar antenna. The antenna 41 has a larger area than the antenna 20A of the power receiver 100A. The antenna 41 is located on the outside of the adapter 300, as illustrated in FIG. 13. In the example in FIG. 13, the antenna 41 is located on the outside of the body 310c. The antenna 41 may be located in a part other than the body 310c. For example, the antenna 41 may be located on the outside of the top surface 310a illustrated in FIG. 13, or located on the outside of the bottom surface 310b illustrated in FIG. 13.

The antenna 41 can function as an antenna for receiving electromagnetic waves as with the antenna 20A, when the power generator 20 generates power by electromagnetic waves from the power transmitter 200 (see FIG. 1). In this case, the electromagnetic waves received by the antenna 41 are supplied to the rectifier circuit 20B in the power receiver 100A. By receiving electromagnetic waves for power supply by the antenna 20A and the antenna 41 having a larger area than the antenna 20A, the power reception efficiency for electromagnetic waves can be improved in this embodiment. Moreover, in this embodiment, the power reception efficiency for electromagnetic waves can be further improved by installing the antenna 41 on the outside of the adapter 300.

The antenna 41 can also emit a pilot signal for positioning to the power transmitter 200.

The antenna 41 may be connected in parallel with the antenna 20A, or in series with the antenna 20A.

The memory 50 stores information necessary for the processes of the adapter 300 and a program in which the processes for achieving the functions of the adapter 300 are written.

The controller 51 controls and manages the entire adapter 300. The controller 51 is composed of, for example, any suitable processor such as a general-purpose central processing unit (CPU) that reads software for executing the processes of each of the functions, or a dedicated processor specialized for the processes of each of the functions.

As mentioned above, upon receiving a pilot signal for positioning from another device, the power transmitter 200 may transmit electromagnetic waves for power supply in a plurality of arrival directions of the received pilot signal. In the case where the power transmitter 200 is designed in this manner, the controller 51 transmits a pilot signal for positioning by the antenna 41. The process of the controller 51 relating to this will be described in the following positioning process.

<Positioning Process>

The controller 51 determines whether the power receiver 100A is generating power. For example, in the case where the controller 51 determines that power is supplied from the power receiver 100A to the first output interface 311 and the second output interface 312, the controller 51 determines that the power receiver 100A is generating power.

In the case where the controller 51 determines that the power receiver 100A is generating power, the controller 51 transmits a pilot signal for positioning by the antenna 41. The pilot signal for positioning emitted from the adapter 300 reflects on walls and the like in the room and arrives at the power transmitter 200 by multipath.

Instead of determining whether the power receiver 100A is generating power, the controller 51 may determine whether the power receiver 100A is contained in the container 310. In the case where the controller 51 determines that the power receiver 100A is contained in the container 310, the controller 51 may transmit a pilot signal for positioning by the antenna 41. In the case where the controller 51 determines that power corresponding to the self-discharge of the power receiver 100A is output from the first output interface 311 and the second output interface 312, the controller 51 determines that the power receiver 100A is contained in the container 310.

[System Operation]
<Authentication Operation>

Figure 16:
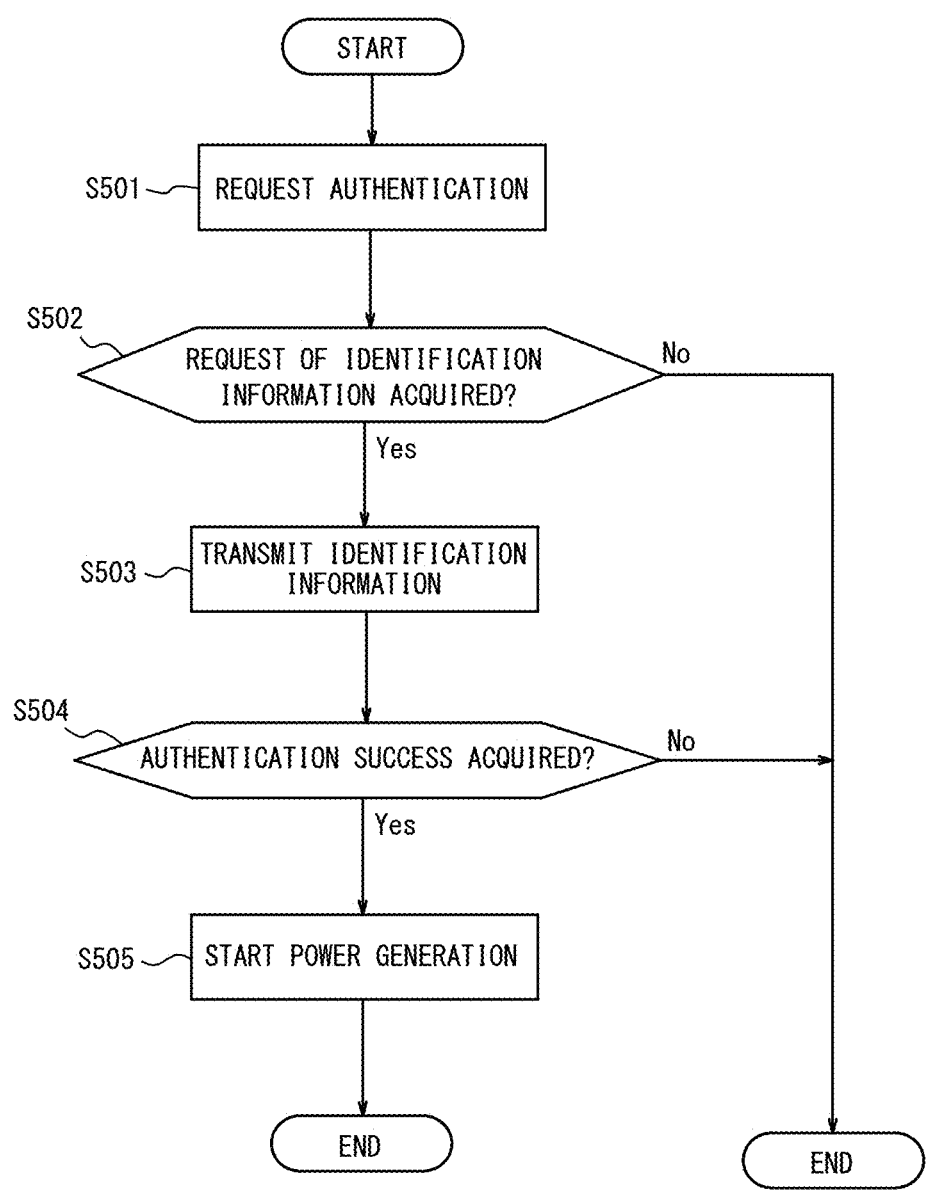
FIG. 16 is a flowchart illustrating the operation of the power receiver according to Embodiment 4 of the present disclosure when communicating with a power transmitter.

Operation of the power receiver 100A when communicating with the power transmitter 200 will be described below, with reference to FIG. 16.

Figure 6:
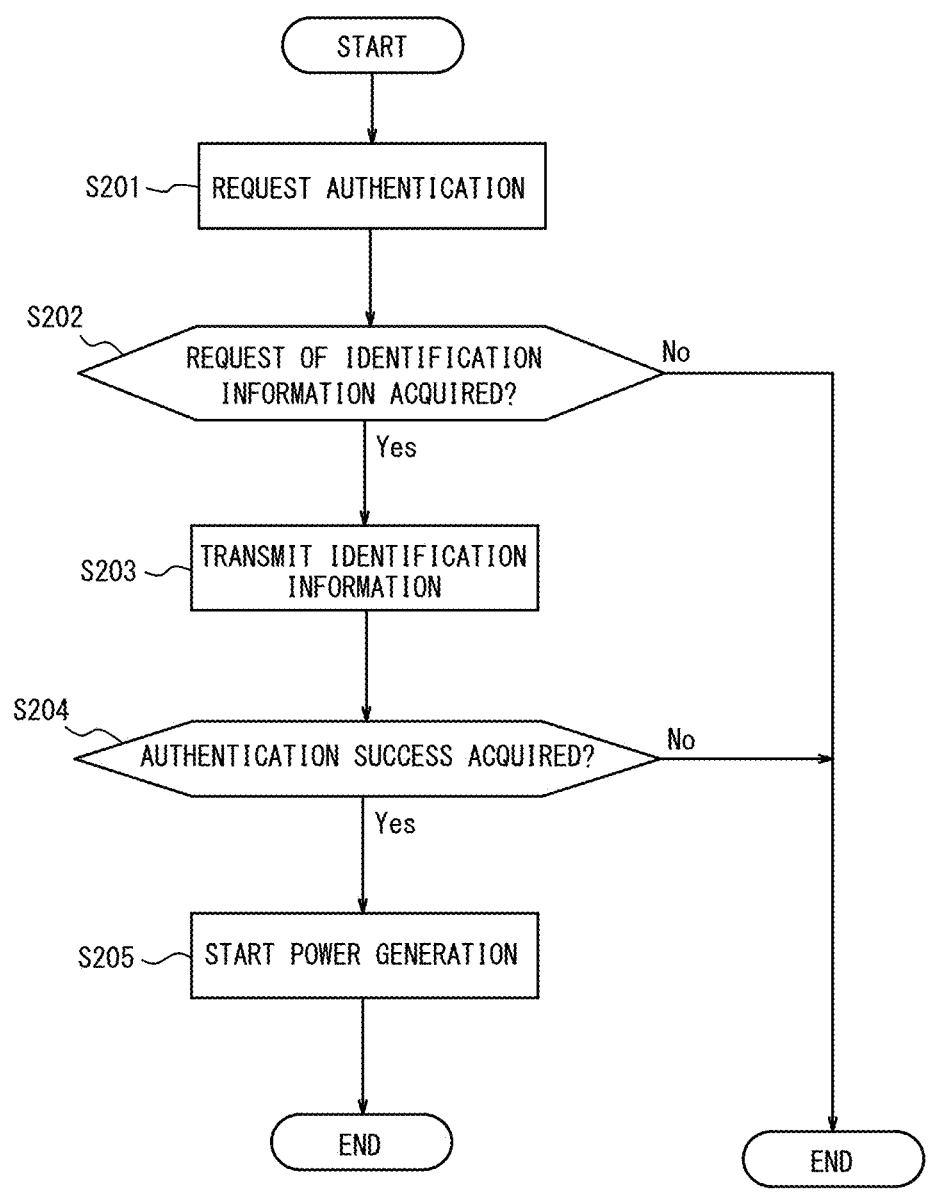
FIG. 6 is a flowchart illustrating the operation of the power receiver according to Embodiment 1 of the present disclosure when communicating with a power transmitter.

The controller 31 performs the processes of steps S501 to S505, in the same way as the processes of steps S201 to S205 illustrated in FIG. 6.

<Positioning Operation>

Figure 17:
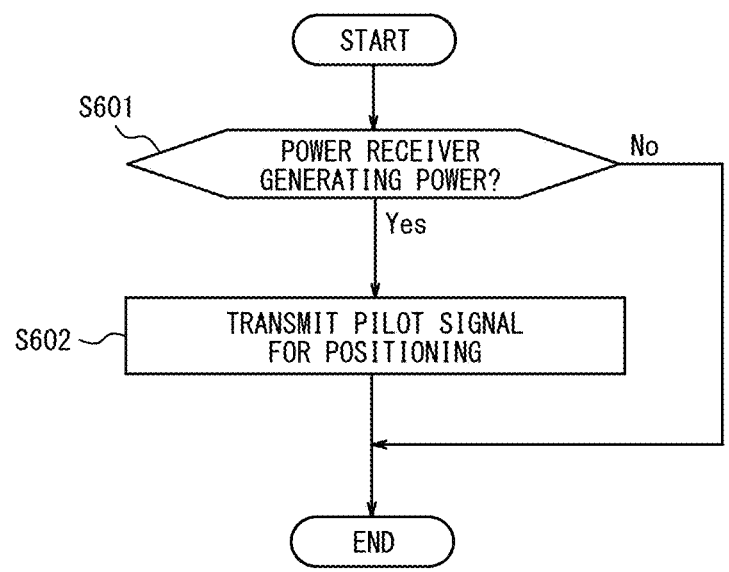
FIG. 17 is a flowchart illustrating the operation of the adapter according to Embodiment 4 of the present disclosure when transmitting a pilot signal for positioning to a power transmitter.

The operation of the adapter 300 when transmitting a pilot signal for positioning to the power transmitter 200 will be described below, with reference to FIG. 17.

First, the controller 51 determines whether the power receiver 100A is generating power (step S601). In the case where the controller 51 determines that the power receiver 100A is generating power (step S601: Yes), the controller 51 advances to the process of step S602. In the case where the controller 51 determines that the power receiver 100A is not generating power (step S601: No), the controller 51 ends the process.

In the process of step S602, the controller 51 transmits a pilot signal for positioning, by the antenna 41.

With such processes of steps S601 and S602, a pilot signal for positioning emitted from the adapter 300 reflects on walls and the like in the room and arrives at the power transmitter 200 by multipath. Upon receiving a plurality of pilot signals, the power transmitter 200 transmits electromagnetic waves for power supply in a plurality of arrival directions of the received pilot signals. The electromagnetic waves for power supply travel in reverse through each path of the pilot signal, and arrive at the power receiver 100A. Thus, the electromagnetic waves for power supply concentrate in the power receiver 100A. This improves the efficiency of power transmission from the power transmitter 200 to the power receiver 100A.

In the process of step S601, instead of determining whether the power receiver 100A is generating power, the controller 51 may determine whether the power receiver 100A is contained in the container 310. In the case where the controller 51 determines that power corresponding to the self-discharge of the power receiver 100A is output from the first output interface 311 and the second output interface 312, the controller 51 determines that the power receiver 100A is contained in the container 310. In the case where the controller 51 determines that the power receiver 100A is contained in the container 310, the controller 51 transmits a pilot signal for positioning by the antenna 41 in the process of step S602.

As described above, with the adapter 300 according to Embodiment 4, the chip-shaped small power receiver 100A illustrated in FIG. 14 can be contained in a battery holder of an electronic device. By containing, instead of a dry battery, the power receiver 100A in the battery holder of the electronic device, the electronic device can be supplied with power from the power transmitter 200 illustrated in FIG. 1. Hence, according to this embodiment, an electronic device designed to be driven by a dry battery or the like can be supplied with power by electromagnetic waves. The power supply method can thus be improved according to this embodiment.

Embodiment 5

Embodiment 5 will be described below. The adapter 300 according to Embodiment 4 is a type of adapter in which the power receiver 100A is contained. An adapter according to Embodiment 5 is a type of adapter on which a power receiver is mounted. The following description mainly focuses on the differences from the adapter 300 according to Embodiment 4.

Figure 18:
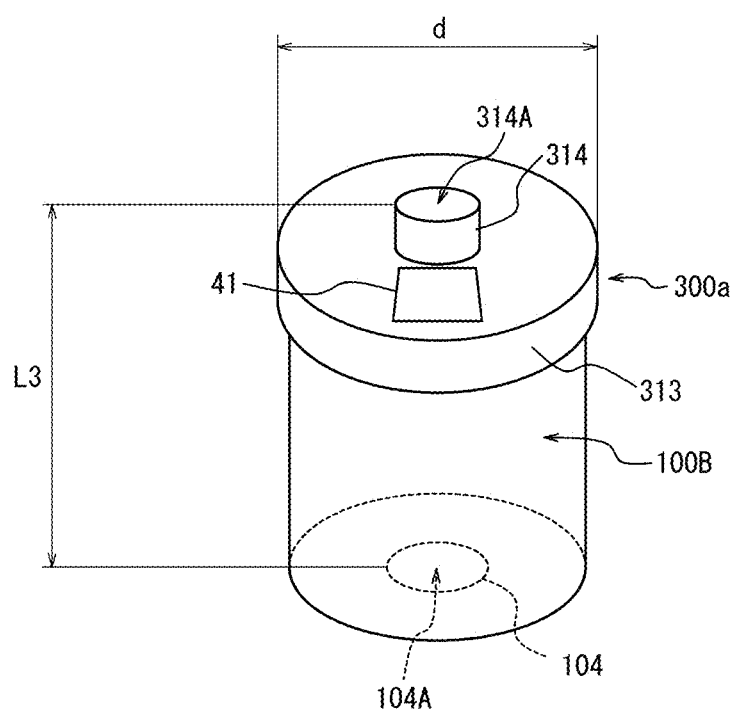
FIG. 18 is an external perspective diagram after a power receiver is mounted on an adapter according to Embodiment 5 of the present disclosure.
Figure 19:
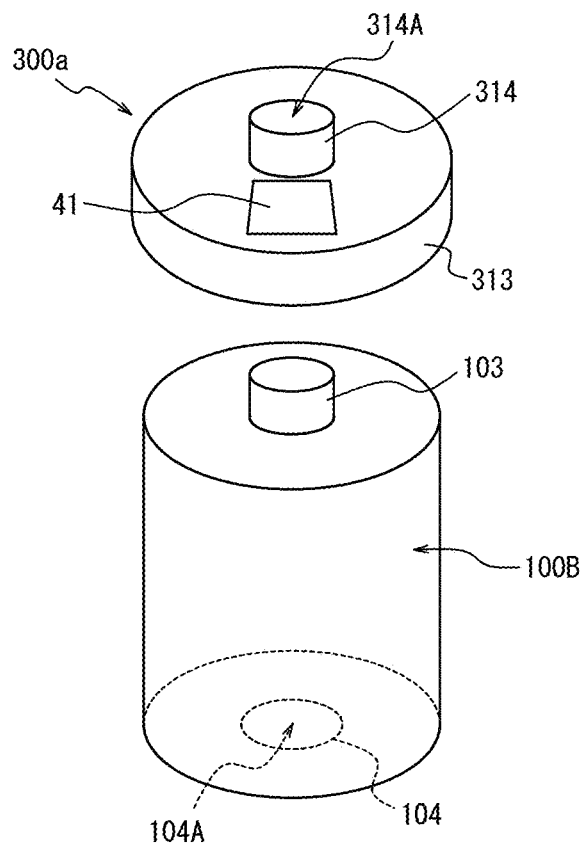
FIG. 19 is an external perspective diagram before the power receiver is mounted on the adapter according to Embodiment 5 of the present disclosure.

FIG. 18 is an external perspective diagram after an adapter 300a according to Embodiment 5 of the present disclosure is mounted on a power receiver 100B. FIG. 19 is an external perspective diagram before the adapter 300a according to Embodiment 5 of the present disclosure is mounted on the power receiver 100B.

The power receiver 100B according to Embodiment 5 can achieve the same functions as the power receiver 100A according to Embodiment 4. The power receiver 100B includes the power generator 20 including the antenna 20A and the rectifier circuit 20B, the communication interface 21, the memory 30, and the controller 31 illustrated in FIG. 15, as with the power receiver 100A according to Embodiment 4.

The power receiver 100B according to Embodiment 5 is columnar, as illustrated in FIG. 19. The power receiver 100B generates power by external electromagnetic waves. The power receiver 100B includes a positive electrode terminal 103 and a negative electrode terminal 104.

The positive electrode terminal 103 functions as a positive electrode when outputting power generated by the power receiver 100B to the outside. The negative electrode terminal 104 functions as a negative electrode when outputting power generated by the power receiver 100B to the outside.

The negative electrode terminal 104 includes a contact portion 104A. The contact portion 104A is electrically connected to the terminal 2D on the negative side of the electronic device illustrated in FIG. 12.

The adapter 300a according to Embodiment 5 can achieve the same functions as the adapter 300 according to Embodiment 4. The adapter 300a includes the antenna 41, the memory 50, and the controller 51 illustrated in FIG. 15, as with the adapter 300 according to Embodiment 4.

The adapter 300a according to Embodiment 5 also has a structure that can be mounted on the power receiver 100B. The adapter 300a includes a mount 313 and an output interface 314.

The mount 313 is removably mounted on part of the power receiver 100B. For example, the mount 313 is mounted on the power receiver 100B so as to cover the positive electrode terminal 103 of the power receiver 100B, as illustrated in FIG. 18. The antenna 41 is located on the top surface of the mount 313.

The output interface 314 outputs power generated by the power receiver 100B to the external electronic device. The output interface 314 is electrically connected to any one of the positive electrode terminal 103 and the negative electrode terminal 104 of the power receiver 100B. In FIG. 18, the output interface 314 is electrically connected to the positive electrode terminal 103 of the power receiver 100B.

The output interface 314 includes a contact portion 314A. The contact portion 314A is electrically connected to the terminal 2C on the positive side of the electronic device illustrated in FIG. 12.

In Embodiment 5, the distance L3 between the contact portion 314A and the contact portion 104A illustrated in FIG. 18 corresponds to a height defined in a predetermined standard relating to dry batteries, as in Embodiment 4. Examples of the predetermined standard include IEC 60086 and JIS C 8500. Thus, the adapter 300a having the power receiver 100B mounted thereon illustrated in FIG. 18 can be contained in the battery holder of the electronic device.

When the adapter 300a having the power receiver 100B mounted thereon illustrated in FIG. 18 is contained in the battery holder 2A illustrated in FIG. 12, the contact portion 314A of the output interface 314 is electrically connected to the terminal 2C on the positive side, and the contact portion 104A of the negative electrode terminal 104 of the power receiver 100B is electrically connected to the terminal 2D on the negative side. Accordingly, power generated by the power receiver 100B is supplied to the electronic device via the contact portion 314A and the contact portion 104A.

With the adapter 300a according to Embodiment 5 having such a structure, the power receiver 100B of the shape illustrated in FIG. 19 can be contained in a battery holder of an electronic device driven by a dry battery or the like. By containing, instead of a dry battery, the power receiver 100B in the battery holder of the electronic device, the electronic device can be supplied with power from the power transmitter 200 illustrated in FIG. 1. Hence, an electronic device designed to be driven by a dry battery or the like can be supplied with power by electromagnetic waves. The power supply method can thus be improved according to this embodiment.

The other effects and functions of the adapter 300a according to Embodiment 5 are the same as those of the adapter 300 according to Embodiment 4.

Embodiment 6

An adapter according to Embodiment 6 will be described below. The following description mainly focuses on the differences from the adapter 300 according to Embodiment 4.

Figure 20:
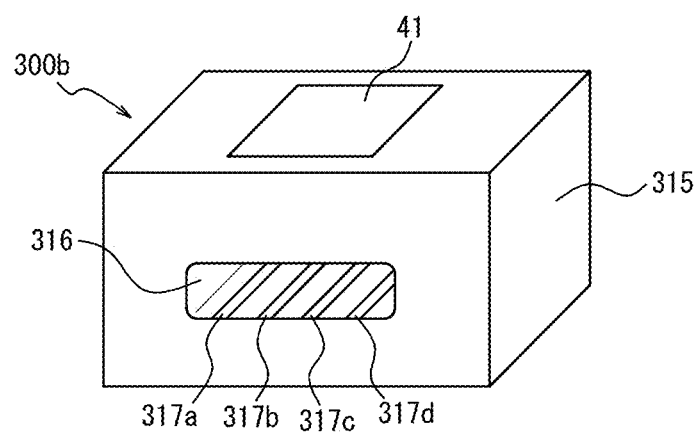
FIG. 20 is an external perspective diagram of an adapter according to Embodiment 6 of the present disclosure.

FIG. 20 is an external perspective diagram of an adapter 300b according to Embodiment 6. The adapter 300b supplies power generated by a power receiver, to an electronic device that can be externally supplied with power via a universal serial bus (USB) interface. Examples of the electronic device that can be supplied with power via a USB interface include a smartphone and a tablet terminal.

The adapter 300b includes a container for containing the power receiver or a mount for having removably mounted thereon the power receiver, and a connector 316. In this embodiment, the adapter 300b includes a container 315, as the container for containing the power receiver or the mount for having removably mounted thereon the power receiver. Alternatively, the adapter 300b may include the mount 313 illustrated in FIG. 19 to be mounted on the power receiver described in Embodiment 5.

The container 315 contains the power receiver. The antenna 41 is located on the top surface of the container 315.

The connector 316 is an output interface that outputs power generated by the power receiver in the container 315 to the external electronic device. The connector 316 complies with the USB standard. In this embodiment, the connector 316 complies with Type A of the USB standard. Alternatively, the connector 316 may comply with any other USB standard. The connector 316 includes a pin (first pin) 317a, a pin 317b, a pin 317c, and a pin (second pin) 317d. The pin 317a functions as a positive electrode. The pin 317d functions as a negative electrode. The pins 317b and 317c output data.

A USB plug of the electronic device is inserted in the connector 316. When the USB plug of the electronic device is inserted in the connector 316, power generated by the power receiver 100A is supplied to the electronic device via the pins 317a and 317d.

Figure 21:
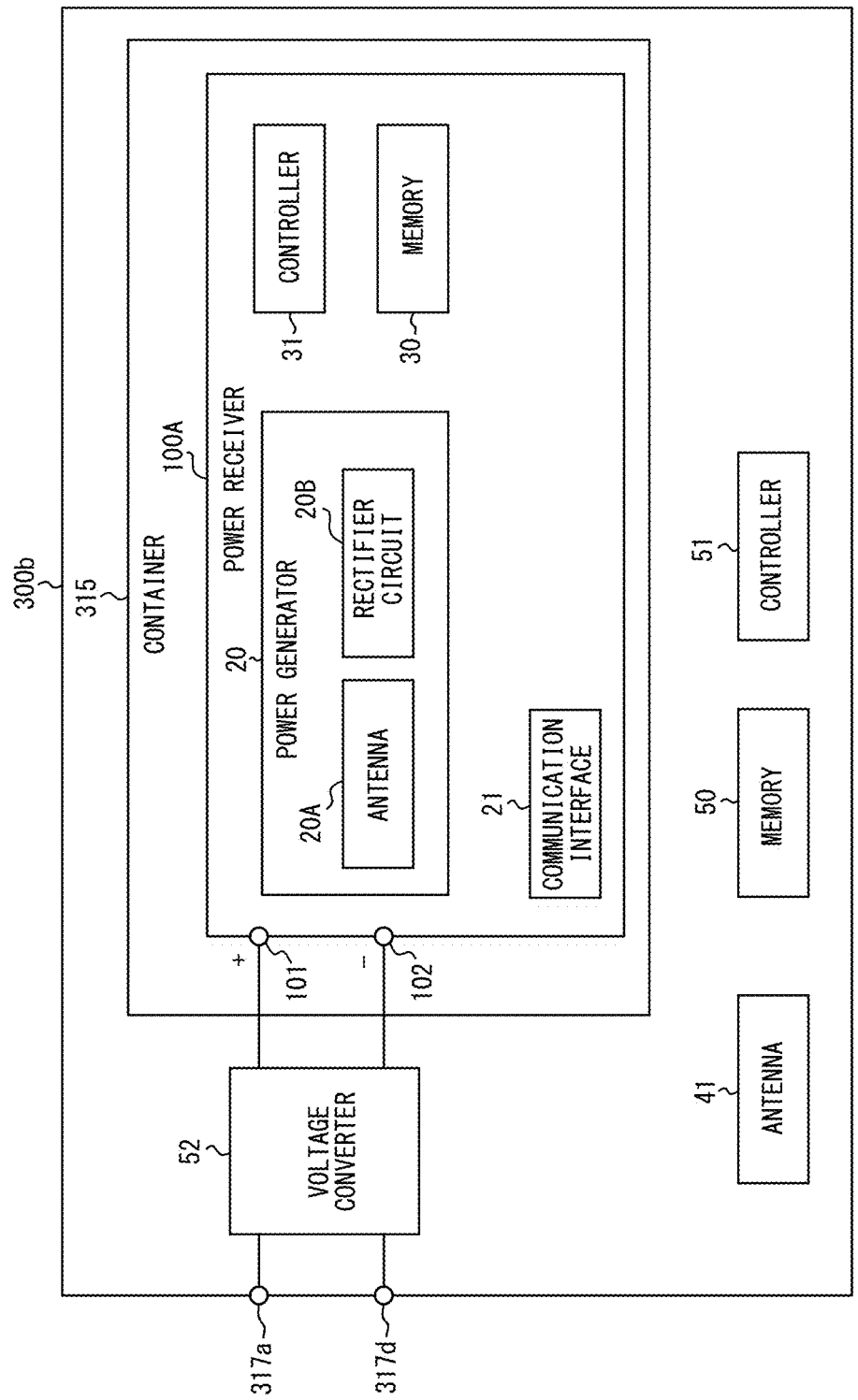
FIG. 21 is a functional block diagram of the adapter according to Embodiment 6 of the present disclosure.

The functions of the adapter 300b according to Embodiment 6 will be described below, with reference to FIG. 21. The same components in FIG. 21 as the components in FIG. 15 are given the same reference signs, and their description is omitted.

The adapter 300b includes the container 315, the antenna 41, the memory 50, the controller 51, and a voltage converter 52.

The container 315 contains the power receiver 100B.

The voltage converter 52 is supplied with a voltage from the power receiver 100B via the positive electrode terminal 101 and the negative electrode terminal 102 of the power receiver 100B. The voltage converter 52 converts the voltage supplied from the power receiver 100B into a predetermined voltage (e.g. 5 V±10%), based on control by the controller 51. The voltage converter 52 supplies the voltage resulting from the conversion to the external electronic device via the pins 317a and 317d.

As described above, with the adapter 300b according to Embodiment 6, power generated by the power receiver 100B can be supplied to the external electronic device via the USB interface. In detail, according to this embodiment, the external electronic device can be supplied with power by electromagnetic waves, via the USB interface. The power supply method can thus be improved according to this embodiment.

The other effects and functions of the adapter 300b according to Embodiment 6 are the same as those of the adapter 300 according to Embodiment 4.

Embodiment 7

An adapter according to Embodiment 7 will be described below. The following description mainly focuses on the differences from the adapter 300 according to Embodiment 4.

Figure 22:
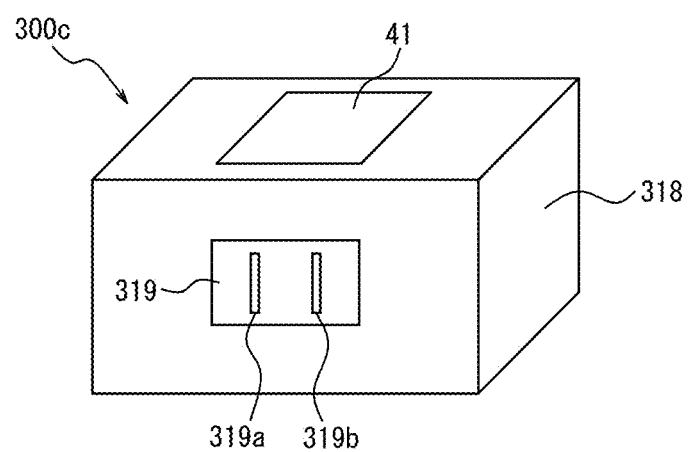
FIG. 22 is an external perspective diagram of an adapter according to Embodiment 7 of the present disclosure.

FIG. 22 is an external perspective diagram of an adapter 300c according to Embodiment 7. The adapter 300c supplies power generated by the power receiver 100A, to an electronic device that can be driven by alternating current (AC) power supplied from a power plug. Examples of the electronic device that can be driven by AC power supplied from a power plug include a lighting fixture and a fan.

The adapter 300c includes a container for containing the power receiver 100A or a mount for having removably mounted thereon the power receiver 100A, and an electrical outlet 319. In this embodiment, the adapter 300c includes a container 318, as the container for containing the power receiver 100A or the mount for having removably mounted thereon the power receiver 100A. Alternatively, the adapter 300c may include the mount 313 illustrated in FIG. 19 to be mounted on the power receiver 100A described in Embodiment 5.

The container 318 contains the power receiver 100A. The antenna 41 is located on the top surface of the container 318.

The electrical outlet 319 is an output interface that outputs power generated by the power receiver 100A in the container 318 to the external electronic device. The electrical outlet 319 complies with a predetermined standard relating to plugs and receptacles for domestic and similar general use. Examples of the predetermined standard include JIS C 8303 relating to plugs and receptacles for domestic and similar general use. In this embodiment, the electrical outlet 319 complies with dipole electrical outlets defined in JIS C 8303. Alternatively, the electrical outlet 319 may comply with any other standard. The electrical outlet 319 includes a first socket 319a and a second socket 319b. The first socket 319a corresponds to the ground side. The second socket 319b corresponds to the non-ground side.

A power plug of the electronic device is inserted in the first socket 319a and the second socket 319b. When the power plug is inserted in the first socket 319a and the second socket 319b, power generated by the power receiver 100A is supplied to the electronic device via the first socket 319a and the second socket 319b.

Figure 23:
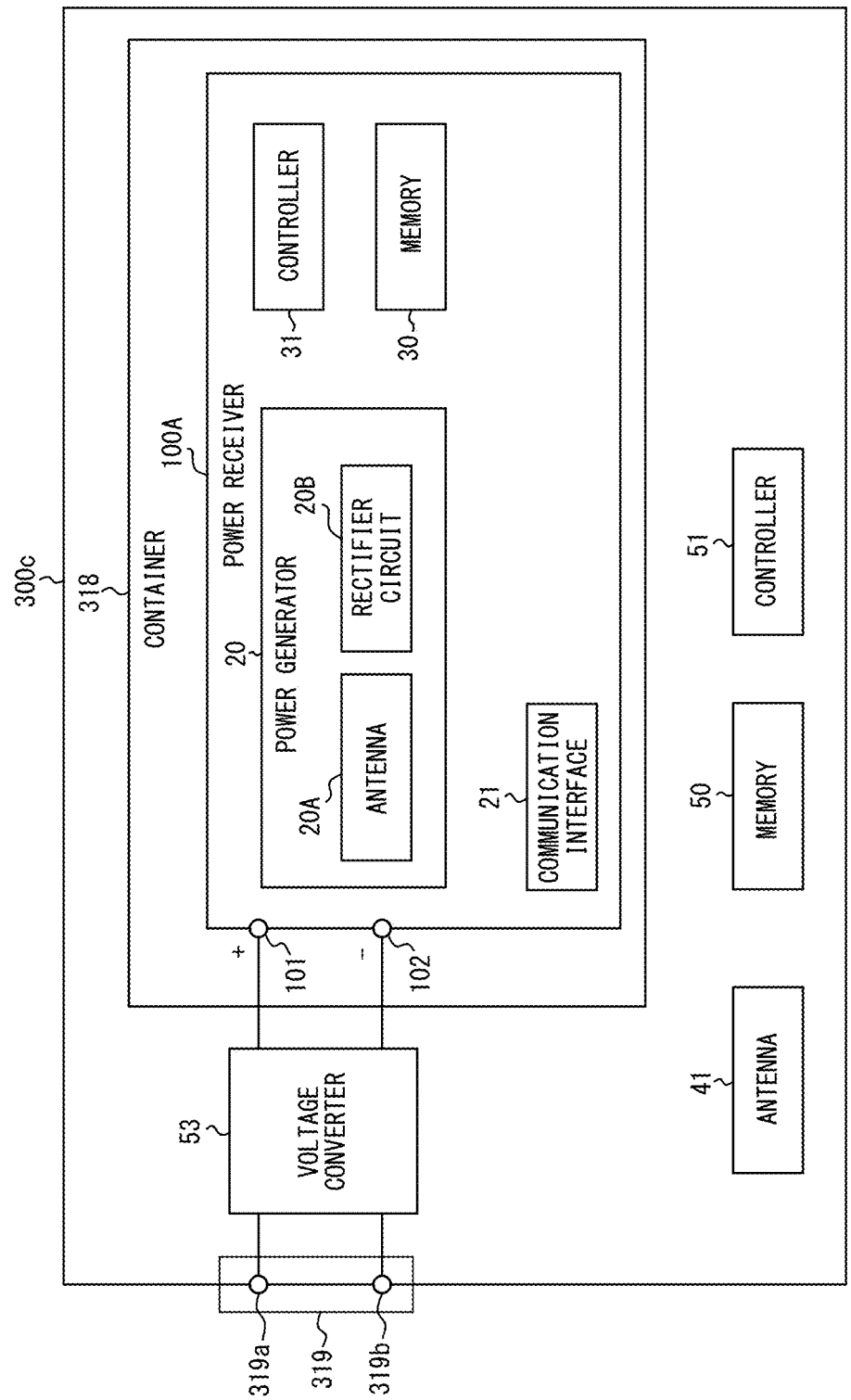
FIG. 23 is a functional block diagram of the adapter according to Embodiment 7 of the present disclosure.

The functions of the adapter 300c according to Embodiment 7 will be described below, with reference to FIG. 23. The same components in FIG. 23 as the components in FIG. 15 are given the same reference signs, and their description is omitted.

The adapter 300c includes the container 318, the electrical outlet 319, the antenna 41, the memory 50, the controller 51, and a voltage converter 53.

The container 318 contains the power receiver 100A.

The voltage converter 53 is supplied with a DC voltage from the power receiver 100A via the positive electrode terminal 101 and the negative electrode terminal 102 of the power receiver 100A. The voltage converter 53 converts the DC voltage supplied from the power receiver 100A into a predetermined AC voltage (e.g. 101 V±6 V), based on control by the controller 51. The voltage converter 53 supplies the AC voltage resulting from the conversion to the external electronic device via the electrical outlet 319.

As described above, with the adapter 300c according to Embodiment 7, power generated by the power receiver 100A can be supplied to an electronic device that can be driven by AC power supplied from a power plug. In detail, according to this embodiment, an electronic device that can be driven by AC power supplied from a power plug can be supplied with power by electromagnetic waves. The power supply method can thus be improved according to this embodiment.

The other effects and functions of the adapter 300c according to Embodiment 7 are the same as those of the adapter 300 according to Embodiment 4.

Many of the disclosed aspects are described in terms of sequences of operations performed by a computer system or other hardware capable of executing program instructions. Examples of the computer system or other hardware include a general-purpose computer, personal computer (PC), dedicated computer, workstation, personal communications system (PCS), electronic notepad, laptop computer, and other programmable data processors. Note that, in each embodiment, various operations are executed by dedicated circuitry (e.g. discrete logical gates interconnected to realize specific functions) implemented by program instructions (software) or logical blocks, program modules, etc. executed by at least one processor. Examples of at least one processor executing logical blocks, program modules, etc. include at least one microprocessor, central processing unit (CPU), application specific integrated circuit (ASIC), digital signal processor (DSP), programmable logic device (PLD), field programmable gate array (FPGA), controller, microcontroller, electronic device, other devices designed to execute the functions described herein, and/or any combination thereof. The embodiments described herein are implemented, for example, by hardware, software, firmware, middleware, microcode, or any combination thereof.

A machine-readable non-transitory storage medium used herein may be in any tangible form of computer-readable carrier (medium) in the categories of solid-state memory, magnetic disk, and optical disk. Such a medium stores an appropriate set of computer instructions, such as program modules, or data structures for causing a processor to carry out the techniques disclosed herein. Examples of the computer-readable medium include an electrical connection having one or more wires, magnetic disk storage medium, other magnetic and optical storage devices (e.g. compact disk (CD), digital versatile disc (DVD), Blu-ray Disc), portable computer disk, random access memory (RAM), read-only memory (ROM), erasable programmable read-only memory (EPROM), electrically erasable programmable read-only memory (EEPROM), flash memory, other rewritable and programmable ROM, other tangible storage medium capable of storage, and any combination thereof. Memory may be provided inside and/or outside a processor or a processing unit. The term "memory" used herein indicates any type of memory such as long-term storage, short-term storage, volatile, nonvolatile, or other memory. The number and/or types of memory are not limited, and the types of storage media are not limited.

The invention claimed is:
1. A power receiver, comprising:
a power generator configured to generate power by external electromagnetic waves;
a positive electrode terminal configured to function as a positive electrode when the power generated by the power generator is output to an external electronic device, the positive electrode terminal including a first contact portion configured to be electrically connected to the external electronic device;

a negative electrode terminal configured to function as a negative electrode when the power generated by the power generator is output to the external electronic device, the negative electrode terminal including a second contact portion configured to be electrically connected to the external electronic device; and a sensor configured to detect that the power receiver is in a contained state, wherein a distance between the first contact portion and the second contact portion corresponds to a height defined in IEC 60086 or JIS C 8500, the power generator is configured to generate the power when the sensor detects that the power receiver is in the contained state, the sensor includes a pressure sensor configured to detect a pressure applied across the first contact portion and the second contact portion, and the power generator is configured to generate the power when the pressure sensor detects the pressure applied across the first contact portion and the second contact portion.

2. The power receiver according to claim 1,
wherein a potential difference between the positive electrode terminal and the negative electrode terminal is 0.8 V to 1.7 V.

3. The power receiver according to claim 1, further comprising
a body containing at least part of the power generator, wherein
a top surface is located on a top side of the body, and a bottom surface is located on a bottom side of the body,
the positive electrode terminal is located at the top surface, and
the negative electrode terminal is located at the bottom surface.

4. The power receiver according to claim 3,
wherein the body has an extension mechanism.

5. The power receiver according to claim 1, further comprising
a communication interface configured to communicate with a power transmitter that transmits the electromagnetic waves.

6. The power receiver according to claim 1,
wherein the distance between the first contact portion and the second contact portion when the power receiver is in the contained state corresponds to the height defined in IEC 60086 or JIS C 8500.

7. The power receiver according to claim 1, further comprising
a power storage electrically connected to the positive electrode terminal, the negative electrode terminal, and the power generator.

8. The power receiver according to claim 7, further comprising:
a communication interface configured to communicate with a power transmitter that transmits the electromagnetic waves; and
a controller configured to request supply of power depending on a remaining level of the power storage, to the power transmitter via the communication interface.

9. The power receiver according to claim 1, further comprising
an optical emitter configured to emit light when the power generator is generating the power.

10. The power receiver according to claim 9,
wherein the optical emitter is configured to change at least one of emission intensity, emission mode, and emission color, depending on generated power of the power generator.

11. The power receiver according to claim 1, further comprising
a notification interface configured to make a notification when generated power of the power generator is less than or equal to a first threshold.

12. A power receiver, comprising:
a power generator configured to generate power by external electromagnetic waves;
a positive electrode terminal configured to function as a positive electrode when the power generated by the power generator is output to an external electronic device, the positive electrode terminal including a first contact portion configured to be electrically connected to the external electronic device;
a negative electrode terminal configured to function as a negative electrode when the power generated by the power generator is output to the external electronic device, the negative electrode terminal including a second contact portion configured to be electrically connected to the external electronic device; and
a sensor configured to detect that the power receiver is in a contained state,
wherein
a distance between the first contact portion and the second contact portion corresponds to a height defined in IEC 60086 or JIS C 8500,
the power generator is configured to generate the power when the sensor detects that the power receiver is in the contained state,
the sensor includes a conduction sensor configured to detect conduction between the first contact portion and the second contact portion, and
the power generator is configured to generate the power when the conduction sensor detects that the first contact portion and the second contact portion are in conduction with each other.

13. The power receiver according to claim 12, further comprising
a body containing at least part of the power generator, wherein
a top surface is located on a top side of the body, and a bottom surface is located on a bottom side of the body,
the positive electrode terminal is located at the top surface, and
the negative electrode terminal is located at the bottom surface.

14. The power receiver according to claim 12, further comprising
a communication interface configured to communicate with a power transmitter that transmits the electromagnetic waves.

15. The power receiver according to claim 12, further comprising
a power storage electrically connected to the positive electrode terminal, the negative electrode terminal, and the power generator.

16. The power receiver according to claim 12, further comprising
an optical emitter configured to emit light when the power generator is generating the power.

17. The power receiver according to claim 16,
wherein the optical emitter is configured to change at least one of emission intensity, emission mode, and emission color, depending on generated power of the power generator.

18. The power receiver according to claim 12, further comprising
a notification interface configured to make a notification when generated power of the power generator is less than or equal to a first threshold.

* * * * *